US010182177B2

(12) United States Patent
Sasa et al.

(10) Patent No.: US 10,182,177 B2
(45) Date of Patent: Jan. 15, 2019

(54) SIGNAL PROCESSING DEVICE, IMAGE SCANNING DEVICE, IMAGE FORMING APPARATUS, AND METHOD OF CONTROLLING THE SAME

(71) Applicants: Tomohiro Sasa, Tokyo (JP); Masamoto Nakazawa, Kanagawa (JP); Hiroki Shirado, Kanagawa (JP); Hideki Hashimoto, Tokyo (JP)

(72) Inventors: Tomohiro Sasa, Tokyo (JP); Masamoto Nakazawa, Kanagawa (JP); Hiroki Shirado, Kanagawa (JP); Hideki Hashimoto, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/485,323

(22) Filed: Apr. 12, 2017

(65) Prior Publication Data
US 2017/0302821 A1 Oct. 19, 2017

(30) Foreign Application Priority Data

Apr. 15, 2016 (JP) .................................. 2016-082354
Mar. 31, 2017 (JP) .................................. 2017-071041

(51) Int. Cl.
*H04N 1/409* (2006.01)
*H04N 1/00* (2006.01)
(Continued)

(52) U.S. Cl.
CPC ......... *H04N 1/409* (2013.01); *H04N 1/00018* (2013.01); *H04N 1/193* (2013.01); *H04N 1/40056* (2013.01); *H04N 2201/0094* (2013.01)

(58) Field of Classification Search
CPC .... H04N 1/409; H04N 1/00018; H04N 1/193; H04N 1/40056; H04N 2201/0094
(Continued)

(56) References Cited

U.S. PATENT DOCUMENTS

2006/0193013 A1* 8/2006 Hoshi ................ H04N 1/00708
358/474
2007/0188638 A1 8/2007 Nakazawa et al.
(Continued)

FOREIGN PATENT DOCUMENTS

CN 102547163 A 7/2012
JP 2001-024893 A 1/2001
(Continued)

OTHER PUBLICATIONS

Chinese official action dated Nov. 21, 2018 in corresponding Chinese Patent Application No. 201710243129.9.

*Primary Examiner* — Quang N Vo
(74) *Attorney, Agent, or Firm* — Cooper & Dunham LLP

(57) ABSTRACT

A signal processing device includes a signal output circuit, a controller, and a corrector. The signal output circuit outputs a signal according to a physical quantity being input. The controller controls the signal output circuit. The corrector corrects a signal to be corrected. The signal to be corrected is output from the signal output circuit. The signal output circuit selectively performs one of first operation of outputting a characteristic signal that indicates characteristics of the signal output circuit and second operation of outputting a pseudo signal that is generated spuriously, according to control of the controller. The corrector corrects the signal to be corrected based on one of the characteristic signal and the pseudo signal output from the signal output circuit.

12 Claims, 19 Drawing Sheets

(51) Int. Cl.
*H04N 1/193* (2006.01)
*H04N 1/40* (2006.01)

(58) Field of Classification Search
USPC ....................................... 358/461, 1.15, 1.9
See application file for complete search history.

(56) References Cited

U.S. PATENT DOCUMENTS

| | | |
|---|---|---|
| 2008/0252787 A1 | 10/2008 | Nakazawa et al. |
| 2010/0027061 A1 | 2/2010 | Nakazawa |
| 2010/0171998 A1 | 7/2010 | Nakazawa |
| 2011/0026083 A1 | 2/2011 | Nakazawa |
| 2011/0051201 A1 | 3/2011 | Hashimoto et al. |
| 2011/0063488 A1 | 3/2011 | Nakazawa |
| 2012/0057211 A1 | 3/2012 | Shirado |
| 2013/0063792 A1 | 3/2013 | Nakazawa |
| 2013/0094036 A1* | 4/2013 | Itagaki .................. H04N 1/605 358/1.9 |
| 2014/0043629 A1 | 2/2014 | Shirado |
| 2014/0204427 A1 | 7/2014 | Nakazawa |
| 2014/0204432 A1 | 7/2014 | Hashimoto et al. |
| 2014/0211273 A1 | 7/2014 | Konno et al. |
| 2014/0368893 A1 | 12/2014 | Nakazawa et al. |
| 2014/0376063 A1 | 12/2014 | Sasa |
| 2015/0098117 A1 | 4/2015 | Marumoto et al. |
| 2015/0116794 A1 | 4/2015 | Nakazawa |
| 2015/0163378 A1 | 6/2015 | Konno et al. |
| 2015/0222790 A1 | 8/2015 | Asaba et al. |
| 2015/0304517 A1 | 10/2015 | Nakazawa et al. |
| 2016/0003673 A1 | 1/2016 | Hashimoto et al. |
| 2016/0006961 A1 | 1/2016 | Asaba et al. |
| 2016/0112660 A1 | 4/2016 | Nakazawa et al. |
| 2016/0119495 A1 | 4/2016 | Konno et al. |
| 2016/0173719 A1 | 6/2016 | Hashimoto et al. |
| 2016/0219163 A1 | 7/2016 | Shirado et al. |
| 2016/0268330 A1 | 9/2016 | Nakazawa et al. |
| 2016/0295138 A1 | 10/2016 | Asaba et al. |
| 2016/0373604 A1 | 12/2016 | Hashimoto et al. |
| 2017/0019567 A1 | 1/2017 | Konno et al. |

FOREIGN PATENT DOCUMENTS

| | | |
|---|---|---|
| JP | 2006-238288 | 9/2006 |
| JP | 2014-138356 | 7/2014 |

* cited by examiner

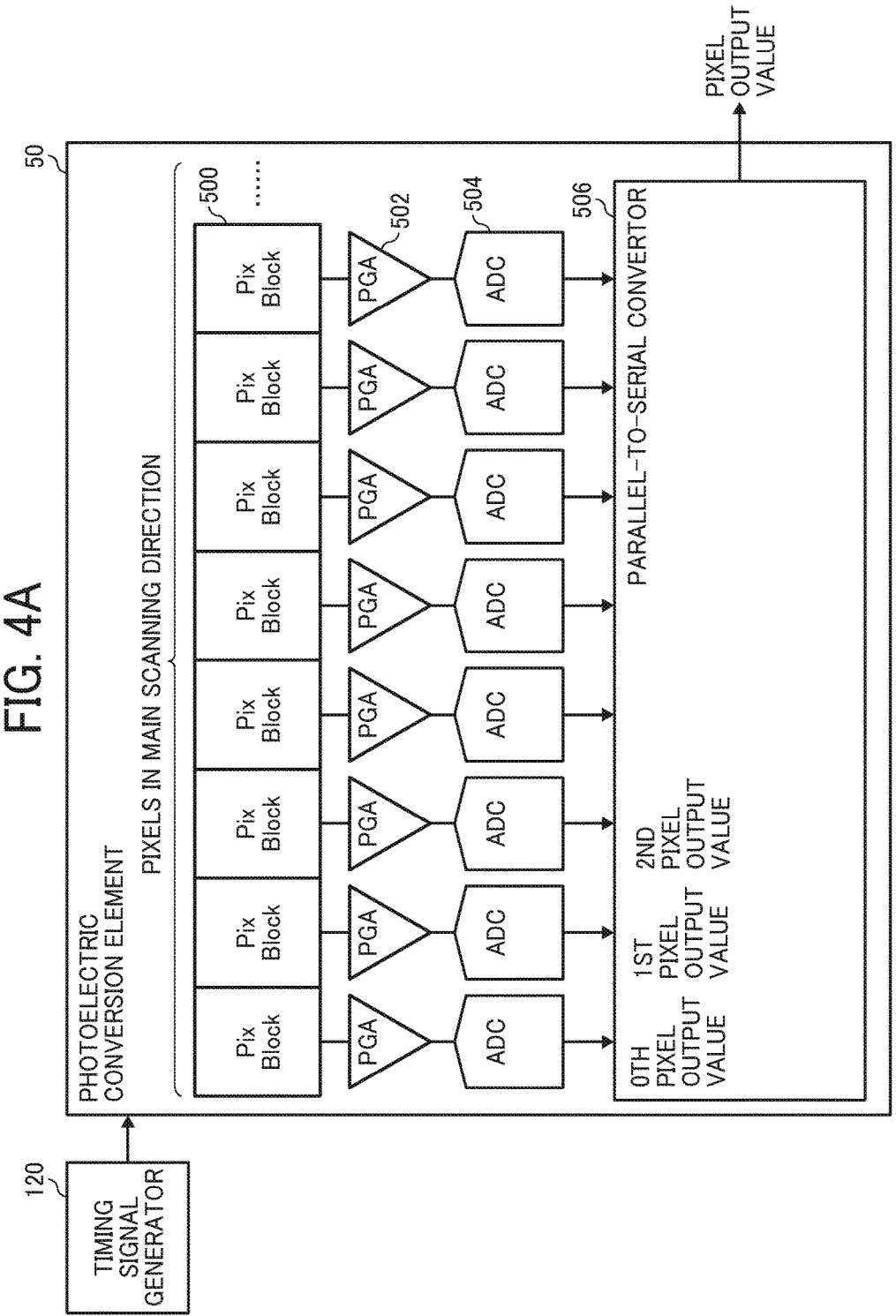

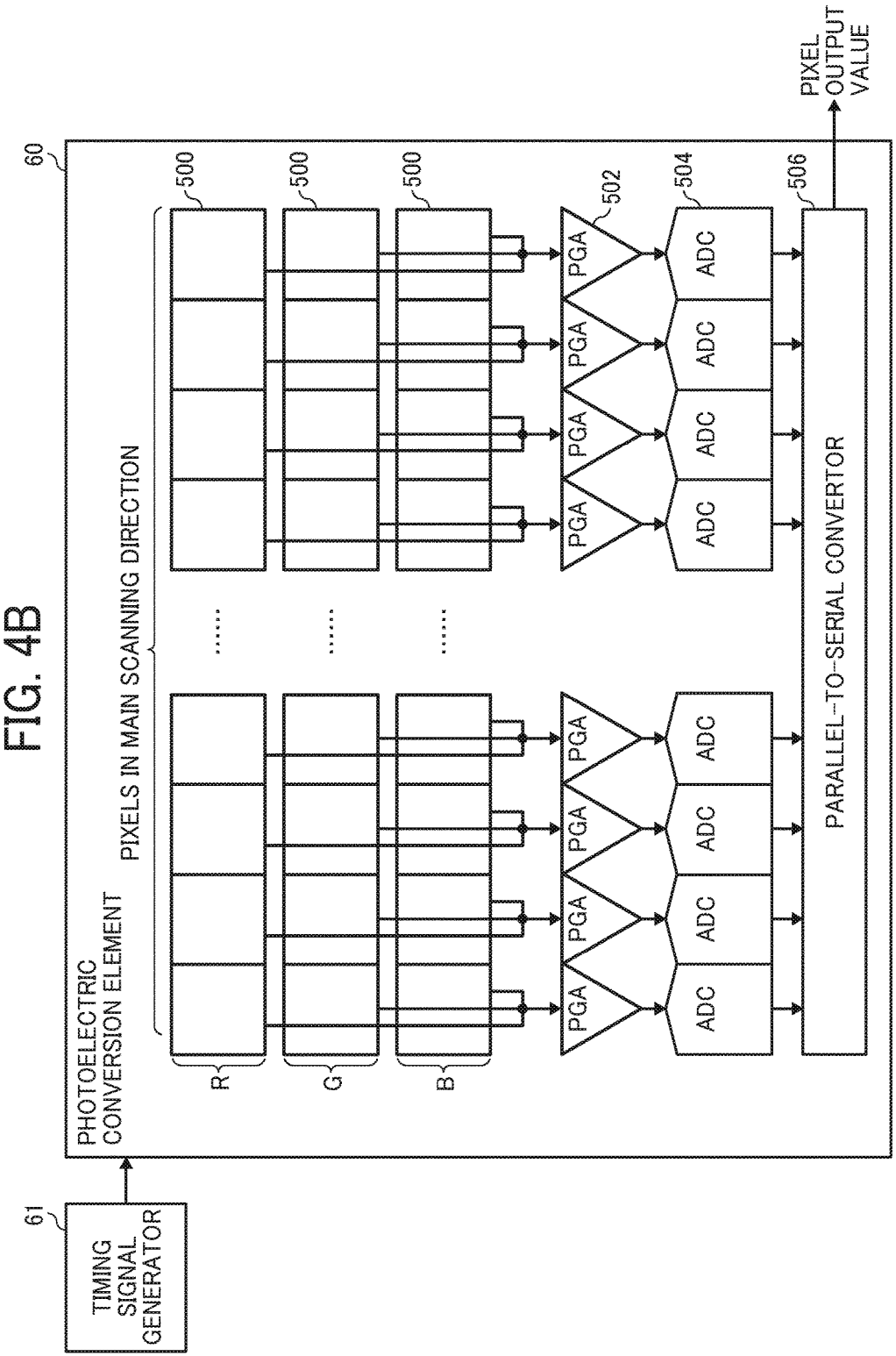

SIGNAL PROCESSING DEVICE, IMAGE SCANNING DEVICE, IMAGE FORMING APPARATUS, AND METHOD OF CONTROLLING THE SAME

CROSS-REFERENCE TO RELATED APPLICATION

This patent application is based on and claims priority pursuant to 35 U.S.C. § 119(a) to Japanese Patent Application Nos. 2016-082354, filed on Apr. 15, 2016, and 2017-071041, filed on Mar. 31, 2017, in the Japan Patent Office, the entire disclosure of which are hereby incorporated by reference herein.

BACKGROUND

Technical Field

Embodiments of the present disclosure relate to a signal processing device, an image scanning device, an image forming apparatus, and a method of controlling the same.

Description of the Related Art

Known image scanning devices may cause such a vertical streak due to a fixed pattern noise in a liner image sensor, resulting in deterioration of image quality. To prevent the deterioration of the image quality, a method of performing black shading correction is known. By performing the black shading correction, a black level that is a read value in dark is subtracted from a read pixel value to suppress variation in density in pixels in a main scanning direction.

Acquisition of the black level used for the black shading correction generally requires to shield the liner image sensor from light. However, shielding the light causes reduction in productivity. To cope with the reduction in productivity, a technique of using a signal in a reset state obtained under conditions of incident light, as a pseudo black level, is known.

As an example of such a known technique, a photoelectronic convertor resets a charge detector and transfers charge accumulated in a light receiving element to the charge detector to convert the charge into a voltage to be output as a signal in a normal output mode, and, in a dummy black level output mode, resets the charge detector but does not transfer the charge accumulated in a light receiving element to the charge detector and resets the charged detector again to output a signal of black level.

SUMMARY

A signal processing device includes a signal output circuit, a controller, and a corrector. The signal output circuit outputs a signal according to a physical quantity being input. The controller controls the signal output circuit. The corrector corrects a signal to be corrected. The signal to be corrected is output from the signal output circuit. The signal output circuit selectively performs one of first operation of outputting a characteristic signal that indicates characteristics of the signal output circuit and second operation of outputting a pseudo signal that is a pseudo signal of the characteristic signal, according to control of the controller. The corrector corrects the signal to be corrected based on one of the characteristic signal and the pseudo signal output from the signal output circuit.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings;

FIG. 4A is a diagram schematically illustrating a configuration of a photoelectric conversion element and a peripheral component of the photoelectric conversion element;

FIG. 4B is a diagram schematically illustrating a configuration of a photoelectric conversion element having columns each configuring with three pixels of red (R), green (G), and blue (B);

DETAILED DESCRIPTION

Figure 1:
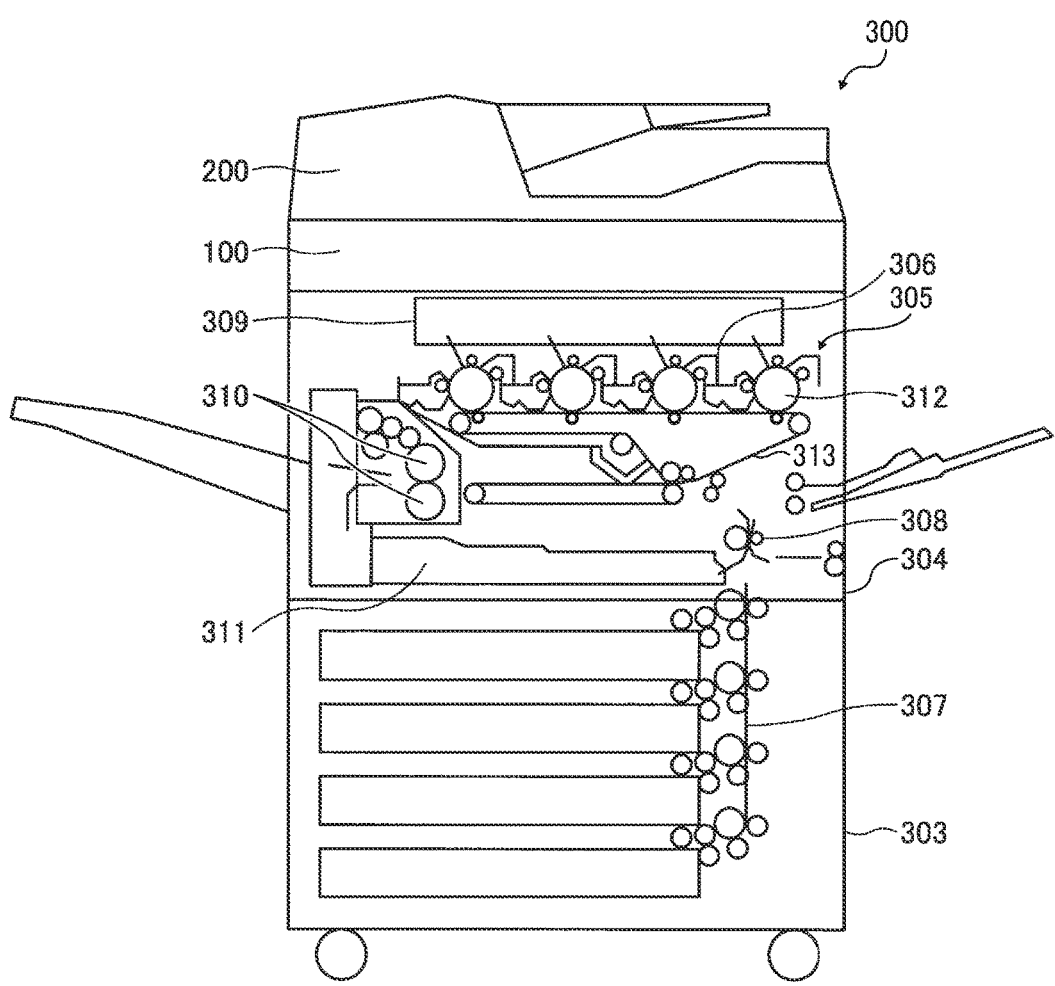
FIG. 1 is a diagram illustrating an example configuration of an image forming apparatus according to one embodiment.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof. In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operation in a similar manner, and achieve a similar result.

First Embodiment

An image forming apparatus 300 according to an embodiment of the disclosure is described with reference to the drawings below. FIG. 1 is a diagram illustrating an example configuration of the image forming apparatus 300 according to the embodiment. The image forming apparatus 300 includes a sheet feeder 303 and a main body 304. The image forming apparatus 300 further includes an image scanning device (one example of a signal processing device) 100 and an automatic document feeder (ADF: conveying device) 200 that are mounted on a top side of the image forming apparatus 300. Alternatively, the image forming apparatus 300 may have a configuration in which the image scanning device 100 includes the automatic document feeder 200.

The main body 304 of the image forming apparatus 300 is provided with a tandem type image forming device (image forming device) 305, a registration roller pair 308 that conveys a recording medium supplied from the sheet feeder 303 through a conveyance device 307, an optical writing device 309, a fixing conveyance path 310 and a duplex tray 311.

The image forming device 305 includes four photoreceptor drums 312 arranged side by side. The four photoreceptor drums 312 correspond to four colors of yellow (Y), magenta (M), cyan (C), and black (K). Around each photoreceptor drum 312, image forming elements such as a charger, a developing device 306, a transferring device, a cleaner, and an electric charge removing device are disposed.

Additionally, the intermediate transfer belt 313 stretches over a driving roller and a driven roller, such that the intermediate transfer belt 313 is sandwiched between the transferring devices and the photoreceptor drums 312 to form nips therebetween.

Such an image forming apparatus 300 that has a tandem type configuration as described above performs optical writing of an image. More specifically, the image forming apparatus 300 optically writes the image of each color of Y, M, C, and K on a corresponding one of the photoreceptor drums 312 to form a latent image, develops the latent image of each color into a toner image with tonner at each developing device 306 and performs primary transfer of the toner images in order of, for example, Y, M, C, and K to the intermediate transfer belt 313 to form a full color image on which the toner images are superimposed one above other.

The full color image is transferred on the recording sheet (secondary transfer) and fixed on the recording sheet, then the recording sheet on which the image is fixed is ejected. The image forming apparatus 300 forms an image read with the image scanning device 100 on the recording sheet.

Figure 2:
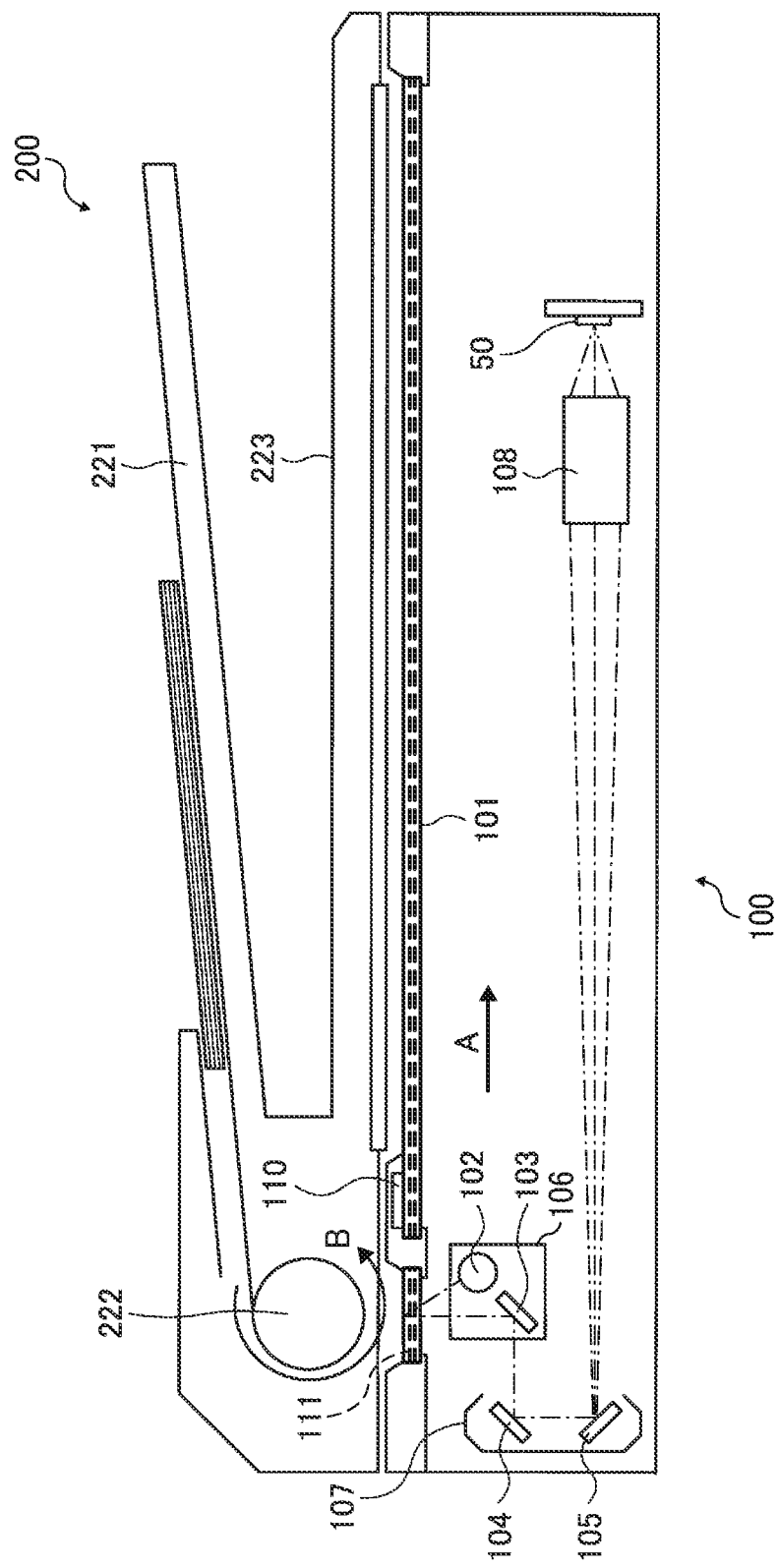
FIG. 2 is a diagram illustrating an example configuration of an image scanning device and an automatic document feeder (ADF)

FIG. 2 is a diagram illustrating an example configuration of the image scanning device 100 and the ADF 200. The image scanning device 100 is a scanner device that is implemented in an image forming apparatus such as a digital copier, a digital multifunction peripheral, and a facsimile. Alternatively, the image scanning device 100 may simply be a scanner. The image scanning device 100 illuminates a document, which is a subject, which has an object image to be read, with light emitted from a light source, processes a signal that is converted from light of reflected light received from the document with a complementary metal oxide semiconductor (CMOS) image sensor, and reads image data of the document.

The image scanning device 100, more specifically, includes a contact glass 101, on which the document is placed, a first carriage (one example of an optical reading device) 106 having a light source device 102 for exposure and a first reflection mirror 103, and a second carriage 107 having a second reflection mirror 104 and a third reflection mirror 105. The image scanning device 100 further includes a photoelectric conversion element (e.g. CMOS linear image sensor) 50, a lens unit 108 to focus an image on the photoelectric conversion element 50, a reference white plate (white reference plate) 110, and a sheet-through reading slit 111.

The image scanning device 100 is provided with the ADF 200 on the top, and the ADF 200 is coupled to the contact glass 101 with a hinge such that the ADF 200 can open relative to the contact glass 101.

The ADF 200 includes a document tray 221 serving as a document table on which a bundle of documents can be set. The ADF 200 also includes a feeding roller 222 that separates the bundle of documents one another and automatically feeds the bundle of documents set on the document tray one by one to the sheet-through reading slit 111. Additionally, there is a pressure plate 223 in a lower part of the ADF 200. The pressure plate 223 also has a function as a background plate used for reading an image via the contact glass 101.

The image scanning device 100 that is in a scan mode scans an image surface of the document to read an image of the document by scanning the document in a direction indicated by an arrow A, which is illustrated in FIG. 2, (sub-scanning direction) with the first carriage 106 and the second carriage 107 using a stepping motor. In scanning, the second carriage 107 moves at half the speed of the first carriage 106 so that an optical path length that is from the contact glass 101 to the photoelectric conversion element 50 is maintained constant.

At the same time, the light source device 102 of the first carriage 106 illuminates (exposes) the image surface that is a lower surface side of the document set on the contact glass 101. Subsequently, reflected light images from the image surface are sequentially transferred to the photoelectric conversion element 50 to be focused on via the first reflection mirror 103 of the first carriage 106, the second reflection mirror 104 and the third reflection mirror 105 of the second carriage 107, and the lens unit 108.

The photoelectric conversion element 50 then outputs a signal that is photoelctrically converted from the light into an electrical signal, and the output signal is converted into a digital signal. As described above, the image of the document is read and digital image data is obtained.

Alternatively, the first carriage 106 and the second carriage 107 move to a lower side of the sheet-through reading slit 111 when the image scanning device 100 is in a sheet-through mode with which the image scanning device 100 reads an image of a document that is automatically fed. Subsequently, the feeding roller 222 feeds the document set on the document tray 211 automatically in a direction indicated by an arrow B, which is illustrated in FIG. 2, (sub-scanning direction), and the document is scanned at a position of the sheet-through reading slit 111.

At the same time, the light source device 102 of the first carriage 106 illuminates a lower side of the document (image surface), which is automatically fed. Through this, a reflected light image from the image surface is transferred to the photoelectric conversion element 50 to be focused on via the first reflection mirror 103 of the first carriage 106, the second reflection mirror 104 and the third reflection mirror 105 of the second carriage 107, and the lens unit 108 in this order. The photoelectric conversion element 50 then outputs a signal that is photoelctrically converted from the light into the electrical signal, and the output signal is converted into the digital signal. As described above, the image of the document is read and digital image data is obtained. The document is discharged to a discharge tray after being read.

Additionally, lighting, which starts before reading the image, in one of the scan mode and the sheet-through mode with the light source device 102, allows the photoelectric conversion element 50 to convert reflected light from the reference white plate 110 into an analog signal and then convert the analog signal into a digital signal. As described above, the reference white plate 110 is read and shading correction in reading the image of the document is performed based on a result of the reading (digital signal).

Additionally, if the ADF 200 includes a conveyor belt, the image scanning device 100 can read the image of the document even when being in the scan mode by automatically feeding the document to a reading position on the contact glass 101 using the ADF 200.

Figure 3:
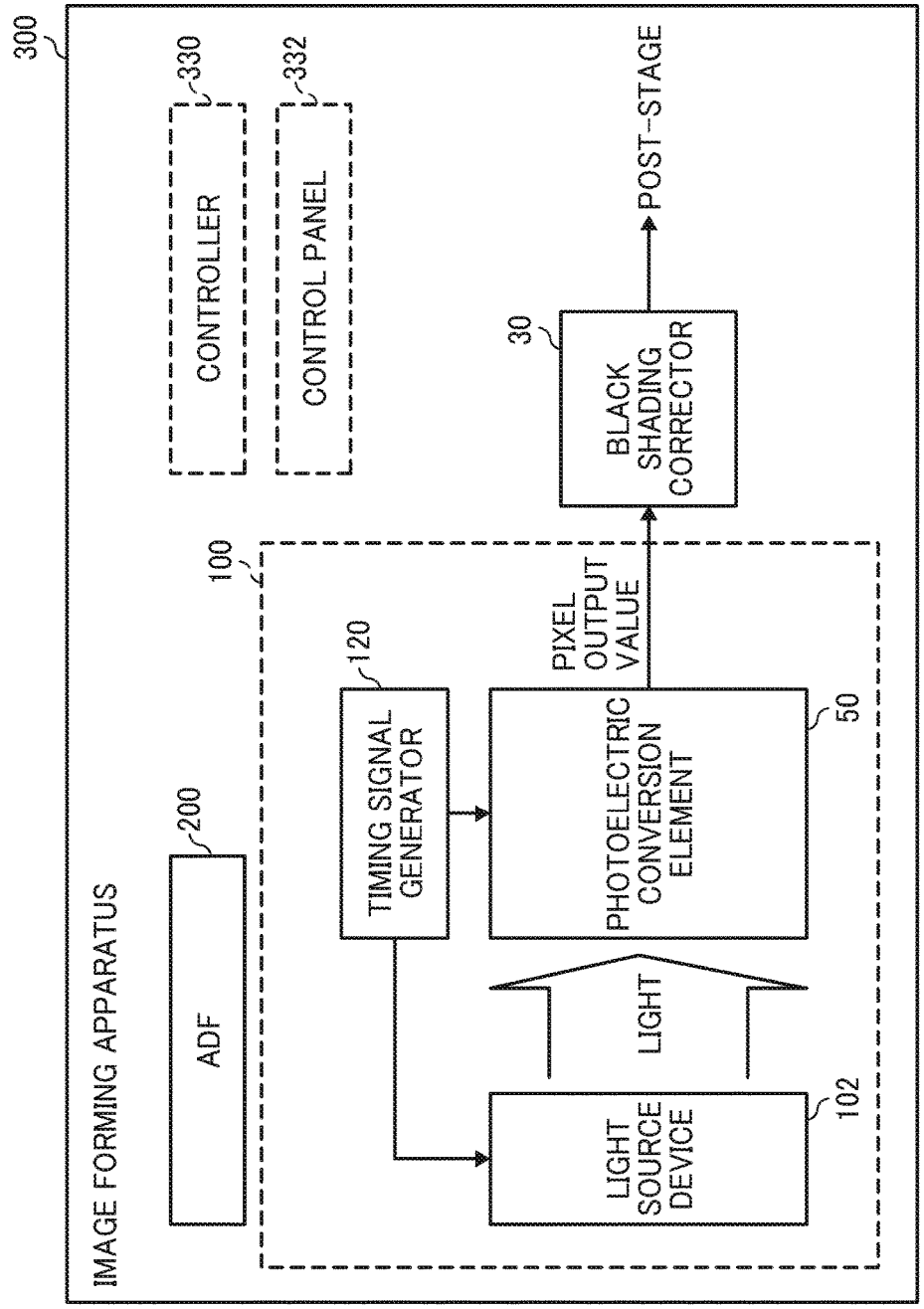
FIG. 3 is a block diagram schematically illustrating functions used for black shading correction performed by the image forming apparatus.

FIG. 3 is a block diagram illustrating functions used for the black shading correction performed by the image forming apparatus 300. In the image scanning device 100, the photoelectric conversion element 50 outputs a pixel output value to a black shading corrector (corrector) 30 in response to a timing signal generated by a timing signal generator (controller) 120. The timing signal generator 120 controls the light source device 102, the photoelectric conversion element 50 and the like. The black shading corrector 30 calculates, in pixel output values output from the photoelectric conversion elements 50, a difference between a read pixel value(s) of a signal to be corrected (pixel output value(s) in reading a document) and one of the pixel output value(s) in dark, which is a value of a reference signal (character signal) for black correction (real black level, which is described later) and the pixel output value(s) of a pseudo reference signal (pseudo signal, which is described later) for the black correction, and performs the black shading correction to correct an offset level in a black side.

As processors placed in the post-stage of the black shading corrector 30, there are, for example, a document size detector that detects a size of the document and an image forming device that forms an image according to the read pixel value. Such processors placed in the post-stage of the black shading corrector 30 are configured as a central processing unit (CPU) that operates according to software or a control circuit such as ASIC. A controller (operating as a movement control unit) 330 is implemented by a computer that includes a CPU and a memory, and controls each component included in the image forming apparatus 300. A control panel 332 is, for example, a touch panel that receives operation from a user to the image forming apparatus 300.

The timing signal generator (controller) 120 and the black shading corrector 30 may be incorporated in the photoelectric conversion element 50, each of which may be implemented by, for example, a circuit. According to the embodiment, the image scanning device 100 externally provided with the black shading corrector 30 is described as an example, however the embodiment is not limited to this and the image scanning device 100 may provide with the black shading corrector 30 inside of the image scanning device 100. For example, the image scanning device 100 includes the black shading corrector 30 inside, when the image scanning device 100 is configured to operate alone. Here, the "movement controlling unit", which may be implemented in the image scanning device 100, may be referred to as a movement controller. When the image forming apparatus 300 operates the image scanning device 100 with this configuration, the movement controller controls movement of the optical reading device based on instructions from the controller 330. Alternatively, the image scanning device 100 may have a configuration integrally including the ADF 200.

FIG. 4A is a diagram schematically illustrating a configuration of the photoelectric conversion element 50 and a peripheral component of the photoelectric conversion element 50. The photoelectric conversion element 50 includes, for example, pixel signal generating circuits (Pix Blocks) 500, amplifiers (PGAs) 502, and analog-to-digital convertors (ADCs: A/D convertors) 504 each of which are corresponding to the number of pixels in a main scanning direction. The pixel signal generating circuit 500, which is a signal output circuit, includes a photo diode (PD) that is a light receiving element to output an electronic signal according to a quantity of light being input, which is described later with reference to FIG. 5. Hereinafter, the pixel signal generating circuit 500 may be referred to as a pixel.

The amplifier 502 amplifies an analog signal output from the pixel signal generating circuit 500 according to a dynamic range of the A/D convertor 504. The A/D convertor 504 converts the analog signal amplified by the amplifier 502 into a digital signal, and outputs the digital signal to a parallel-to-serial convertor 506.

In short, the analog signals output from each of pixel signal generating circuits 500 are converted into digital signals in parallel to be input to the parallel-to-serial convertor 506. The parallel-to-serial convertor 506 performs parallel-to-serial conversion on the input digital signals and outputs the digital signals to the black shading corrector 30 in the post-stage. A timing of outputting (when to output) the signals from each of the pixel signal generating circuit 500, the parallel-to-serial convertor 506, and the like is based on, for example, a clock signal generated by the timing signal generator 120.

FIG. 4B is a diagram schematically illustrating a configuration of a photoelectric conversion element 60 having columns each configuring with three pixels of red (R), green (G), and blue (B). In the photoelectric conversion element 60, the number of pixel signal generating circuits 500 corresponding to the number of pixels, which is corresponding to the number of light-received colors of R/G/B, in the main scanning direction are aligned. The three pixels of R/G/B are connected in parallel to use a corresponding amplifier 502 and A/D convertor 504 in the post-stage in common and configure a column configuration. Each pixel signal generating circuit 500 includes a corresponding color filter of R/G/B.

The analog signals output from each of pixel signal generating circuits 500 are converted into digital signals in parallel to be input to a parallel-to-serial convertor 506. The parallel-to-serial convertor 506 performs parallel-to-serial conversion on the input digital signals and outputs the digital signals to the black shading corrector 30 in the post-stage. A timing of outputting (when to output) the signals from each of the pixel signal generating circuit 500, the parallel-to-serial convertor 506, and the like is based on, for example, a clock signal generated by a timing signal generator 61. In FIG. 4A, the timing signal generator 120 is illustrated as if being external to the photoelectric conversion element 50, however the embodiment is not limited to this and the timing signal generator 120 may be provided in the photoelectric conversion element 50. The same applies to FIG. 4B. The timing signal generator 61 is illustrated as if being external to the photoelectric conversion element 60, however the embodiment is not limited to this and the timing signal generator 61 may be provided in the photoelectric conversion element 60.

Figure 5A:
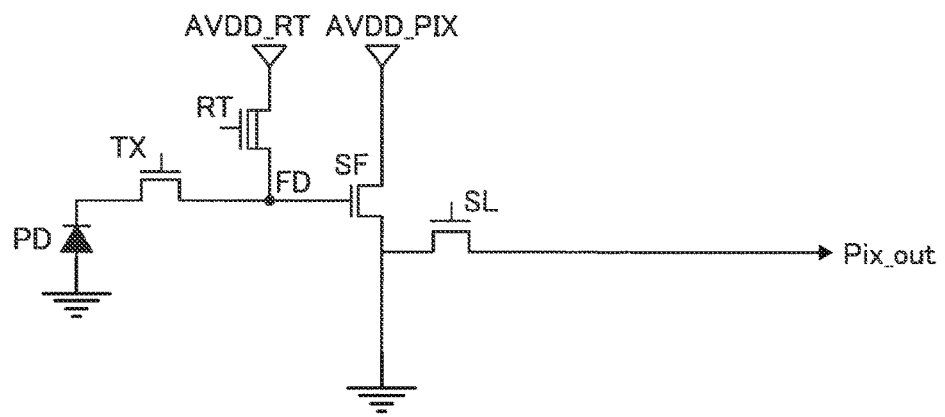
FIGS. 5A and 5B are diagrams each illustrating an example circuit configuration of a pixel signal generating circuit.
Figure 5B:
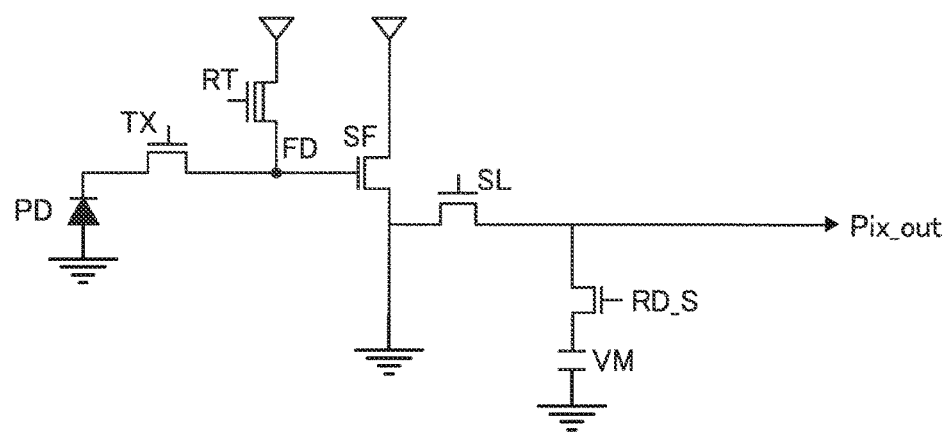

FIGS. 5A and 5B are diagrams each illustrating an example of a circuit configuration of the pixel signal generating circuit 500. FIG. 5A illustrates a first example circuit configuration of the pixel signal generating circuit 500 and FIG. 5B illustrates a second example circuit configuration of the pixel signal generating circuit 500. The pixel signal generating circuit 500 is a signal output unit that includes a photo diode (PD), which is, for example, a light receiving element, a floating diffusion node (FD: charge-voltage conversion unit), a charge transfer switch (TX: transferring unit), a reset switch (RT: resetting unit), a source follower (SF), and a writing switch (SL). Each of the TX, the TR, and the SL is configured with a transistor, and serves as a switch that operates according to control of the timing signal generator 120.

The photo diode (PD) generates and accumulates charge according to incident light. The floating diffusion node (FD) accumulates the charge and converts the charge into a voltage. The charge transfer switch (TX) transfers the charge accumulated at the PD to the FD. The reset switch (RT) resets the FD to set to reset potential (reference voltage) AVDD_RT. The source follower (SF) amplifies current of signal using a power source voltage AVDD_PIX. The writing switch (SL) transfers the signal that is converted into the voltage to the post-stage. The writing switch (SL) also has a function as a selection unit that determines whether to cause the FD to output the accumulated voltage to the post-stage.

If the pixel signal generating circuit 500 has a column configuration as illustrated in FIG. 4B, the pixel signal generating circuit 500 may further include an analog memory (VM) and an analog memory switch (RD_S) in the post-stage of the SL as the second example circuit configuration of FIG. 5B. In the description below, the photoelectric conversion element 50 (see FIG. 4A) having the first example circuit configuration of the pixel signal generating circuit 500 of FIG. 5A and the timing signal generator 120 (see FIG. 4A) are used for easy understanding to explain the embodiment. The same principles described below apply to the photoelectric conversion element 60 (see FIG. 4B) having the second example circuit configuration of the pixel signal generating circuit 500 of FIG. 5B and the timing signal generator 61 (see FIG. 4B).

Figure 6:
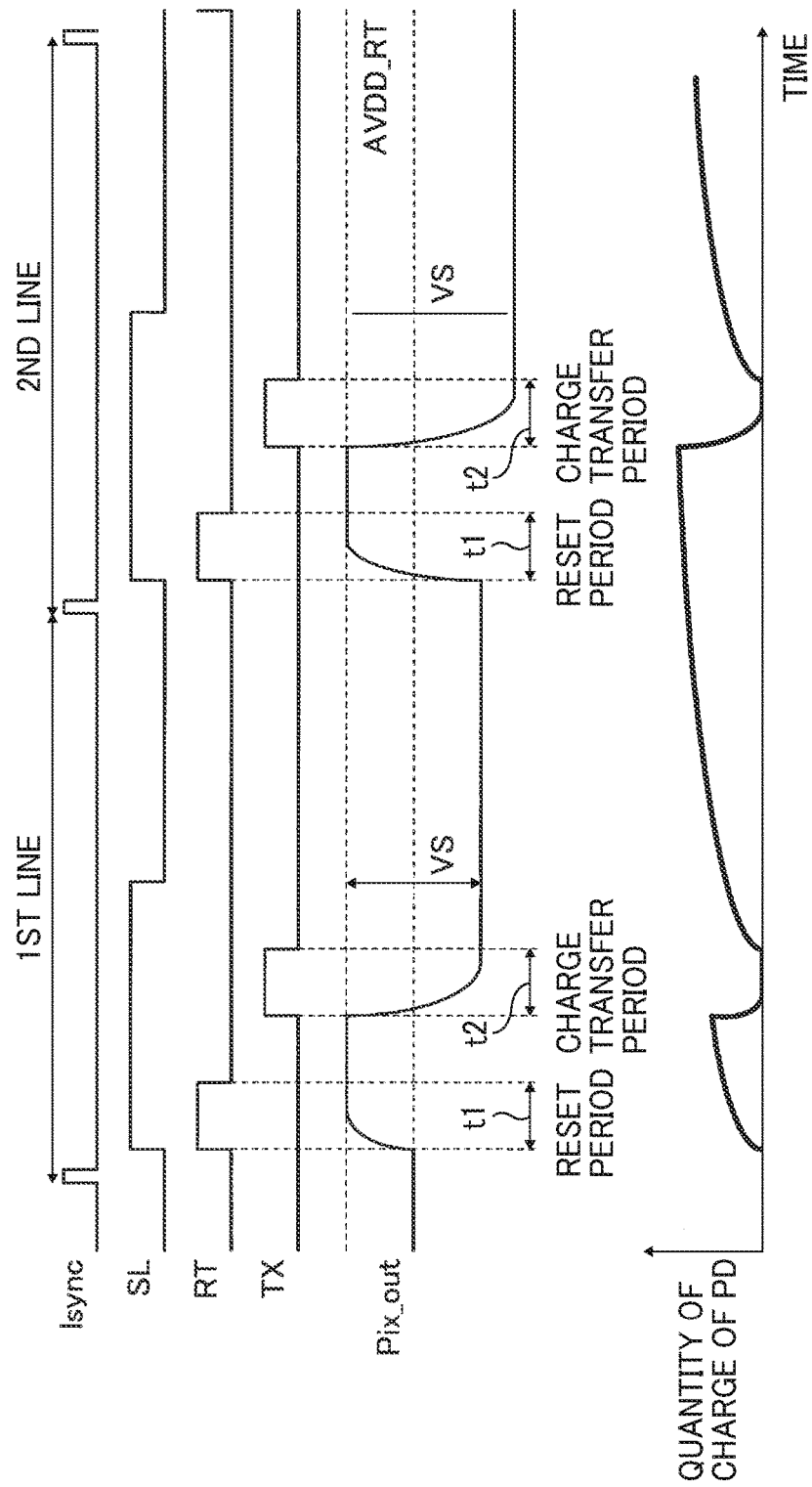
FIG. 6 is a timing chart illustrating an example of operation of the photoelectric conversion element in reading a document.

Example operation of the photoelectric conversion element 50 is described below. FIG. 6 is a timing chart illustrating an example of operation timing state of the pixel signal generating circuit 500 in reading a document. An operation mode in reading the document is, hereinafter, referred to as a normal reading mode. In the normal reading mode, the timing signal generator 120 generates another control signal basically synchronized with a synchronization signal lsync that is corresponding to one line. The pixel signal generating circuit 500, accordingly, operates based on each control signal as described below.

In the pixel signal generating circuit 500, the SL is asserted at the beginning of a line. When the RT is asserted, the reset potential AVDD_RT is transferred as an analog output Pix_out=AVDD_RT via the FD and the SF. An assertion period of the RT is defined as a reset period t1.

Subsequently, after the RT is negated and then the TX is asserted in the pixel signal generating circuit 500, the charge accumulated in the FD are transferred as an analog output Pix_out=VS in the same way as the analog output Pix_out=AVDD_RT. This period, an assertion period of the TX, is defined as a charge transfer period t2. The VS is represented with negative polarity, and is corresponding to one line of charge accumulated in the PD.

Then, when the SL is negated in the pixel signal generating circuit 500, the amplifier 502, the A/D convertor 504, and the parallel-to-serial convertor 506 process to output the digital signal, and the parallel-to-serial convertor 506 transfers the signal of read pixel value to the black shading corrector 30 in the post-stage.

The process described above corresponds to a process for one line in a normal reading operation, and the photoelectric conversion element 50 sequentially repeats the process for subsequent lines in the same way, namely resets, then transfers the charge of the PD, and outputs the read pixel value of each line of the image data to the black shading corrector 30. Additionally, transition of a quantity of charge of the PD is also illustrated in FIG. 6. The pixel signal generating circuit 500 accumulates the charge corresponding to one line in the PD until the TX is asserted. When the TX is asserted, the accumulated charge is transferred to the FD and the quantity of charge becomes zero. After the TX is negated in the pixel signal generating circuit 500, charge to be transferred for a next line are started to be accumulated in the PD.

Each pixel in the photoelectric conversion element 50 has its own pixel characteristics and variation in pixel outputs occurs. For example, when the photoelectric conversion element 50 reads a document that has an even density level, each of all pixels in the main scanning direction ideally outputs a fixed reading level. However, the variation in pixel outputs actually occurs.

To correct difference among read levels due to the variation in the output values, the image scanning device 100 generates a read level (real black level) or an spurious black level (pseudo black level) in the photoelectric conversion element 50 in dark when no light reaches the photoelectric conversion element 50, and subtracts the real black level or the pseudo black level from the real level in units of pixels of the read image in the black shading corrector 30 placed in the post-stage. The real black level is a black level that reflects differences among the PDs, namely reflecting the characteristics of each PD. The pseudo black level is a black level that is spuriously generated without reflecting the differences among the PDs, namely without reflecting the characteristics of each PD.

When generating a reference signal (pixel output value(s) in the dark) having the real black level in the photoelectric conversion element 50, the image scanning device 100 performs the normal reading operation corresponding to one line by causing the timing signal generator 120 to turn off the light source device 102 so that the photoelectric conversion element 50 is positioned where external light does not enter. Accordingly, the pixel signal generating circuit 500 accumulates the charge corresponding to one line in the PD until the TX is asserted. When the TX is asserted, first operation in which the accumulated charge is transferred to the FD is performed. Then, the signal of the pixel output value in the dark for each pixel is transferred as a digital output to the black shading corrector 30 in the post-stage via the parallel-to-serial convertor 506.

Operation of the photoelectric conversion element 50 in generating the pseudo black level is described later as operation of the photoelectric conversion element 50 in a pseudo dark generating mode (second operation).

The image scanning device 100 including the photoelectric conversion element 50 as described above includes the black shading corrector 30 to perform the black shading correction in the post-stage of the photoelectric conversion element 50. Additionally, the image scanning device 100 includes other processors in the post-stage of the black shading corrector 30, namely after the black shading correction, such as processors that detect a size of the document and form an image.

Figure 7:
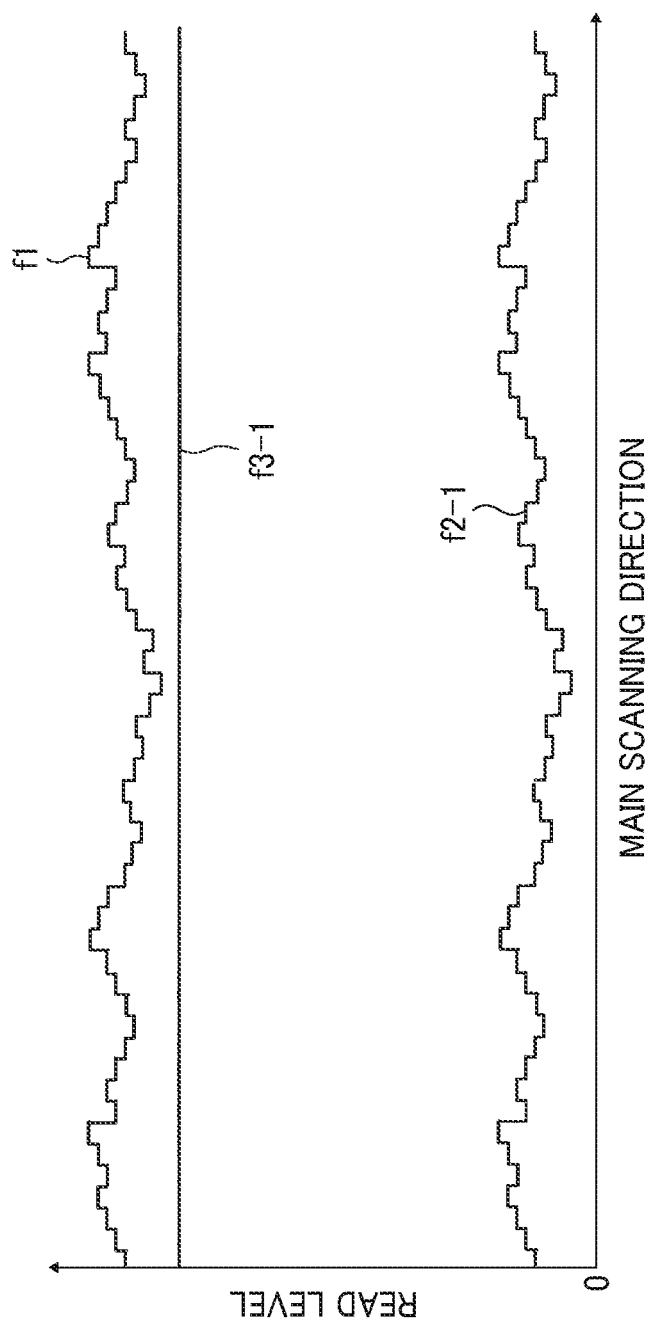
FIG. 7 is a graph illustrating an example of read levels of a read image in performing the black shading correction.

FIG. 7 is a graph illustrating read levels of the read image in performing the black shading correction. A line f1 indicates a read level in the main scanning direction of the read image before the correction. As indicated with the line f1, the variation in the read level (output pixel values) in the main scanning direction of the read image before the correction occurs.

A line f2-1 indicates variation of real black level in the main scanning direction. A line f3-1 indicates a result (change), in the read level in the main scanning direction, obtained after the real black level of the line f2-1 is subtracted from the read level of the line f1. As indicated with the line f3-1, the black level of the read image is equalized by correcting the read image with the real black level.

Figure 8:
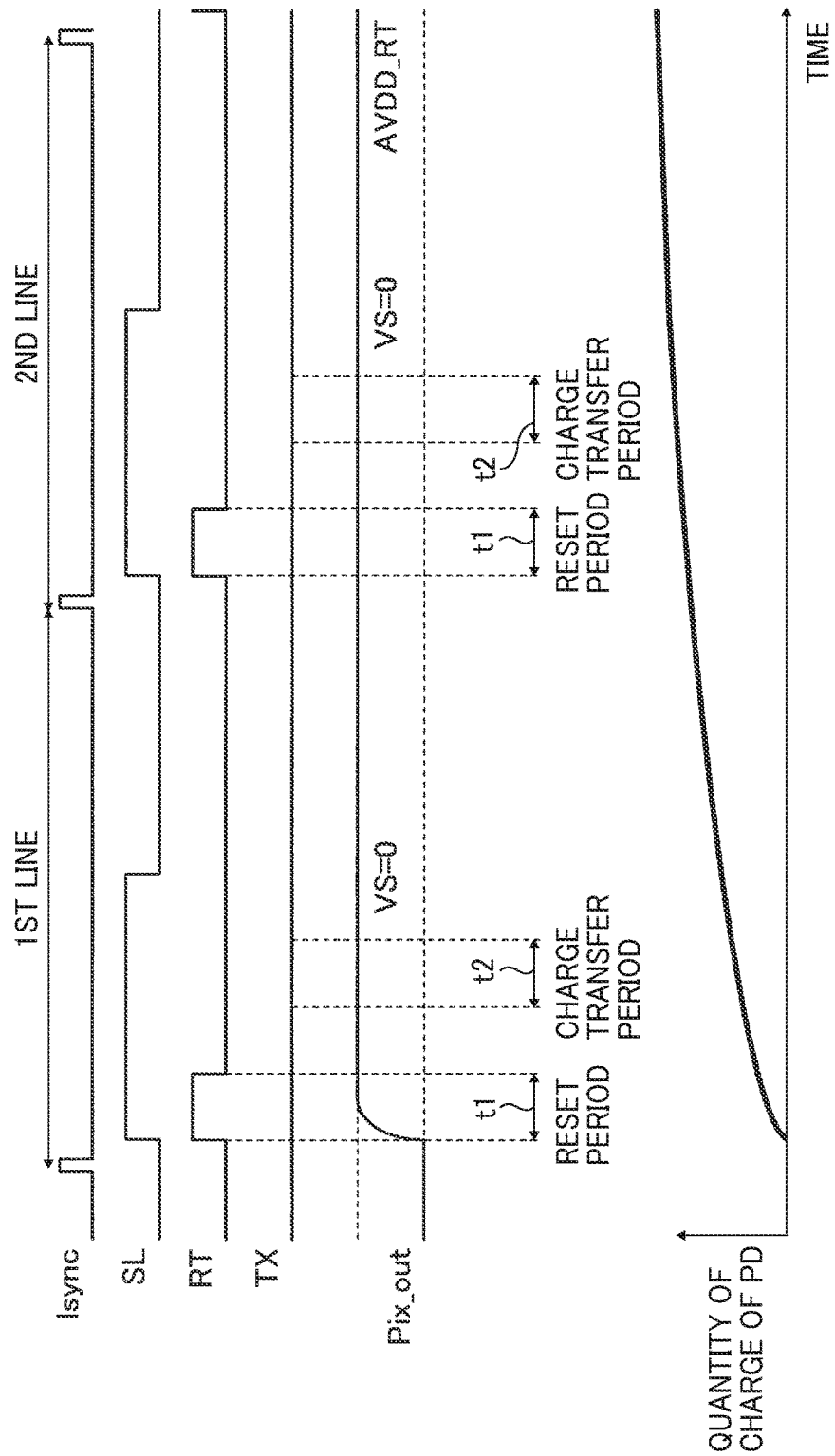
FIG. 8 is a timing chart illustrating an example of operation of the photoelectric conversion in a pseudo dark generating mode.

A technique of acquiring a black level under conditions where the light enters the photoelectric conversion element 50, namely, in a pseudo dark generating mode, is described below. FIG. 8 is a timing chart illustrating operation of the photoelectric conversion element 50 in the pseudo dark generating mode. The pseudo dark generating mode, here, represents a setting condition for acquiring the black level under the conditions where the light enters the photoelectric conversion element 50. In the pseudo dark generating mode, the pixel signal generating circuit 500 performs second operation in which the TX is not asserted after the RT is negated and the reset potential maintaining its state is kept being output to the Pix_out even in the charge transfer period t2.

That is, the charge in the PD are not transferred to the FD, but the quantity of charge continues to rise as described in FIG. 8. At this time, VS=0 is always output to the Pix_out, and the pseudo black level is generated.

The PD accumulates the charge even in a light shielding state due to dark current. Accordingly, a fixed pattern noise (FPN), which occurs due to, for example, variation in gains, in the pseudo dark generating mode, affects a read image. More specifically, in the pseudo dark generating mode, the pseudo reference signal of the black level is spuriously generated without reflecting the charge accumulated in the PD. Accordingly, the fixed pattern noise, which is due to the dark current of the PD, cannot be reflected to the pseudo reference signal, and even if the read image is corrected with the pseudo reference signal, influence of the fixed pattern noise occurs in the corrected read image.

Figure 9:
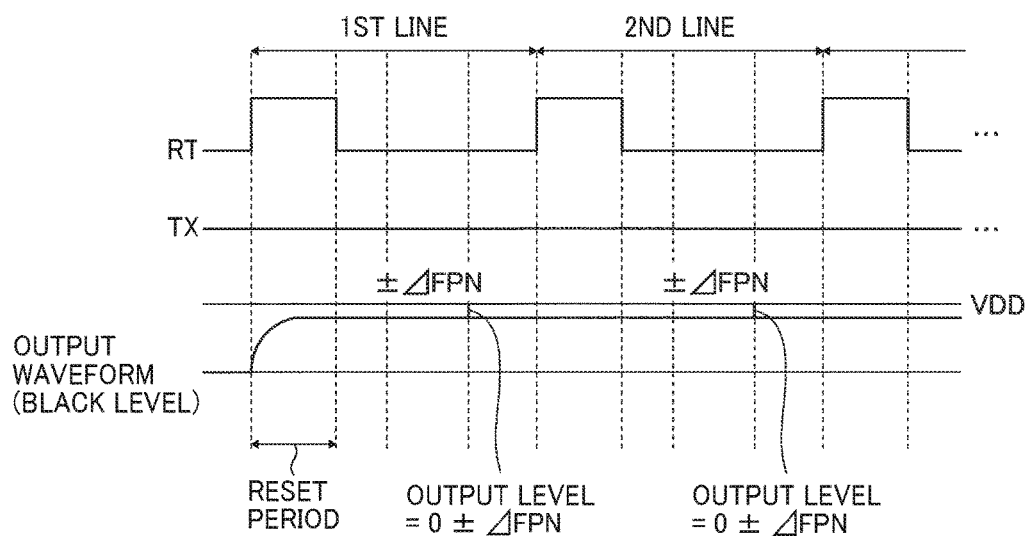
FIG. 9 is a timing chart illustrating output waveform of the pixel signal generating circuit that is affected with a fixed pattern noise.

FIG. 9 is a timing chart illustrating output waveform of the pixel signal generating circuit 500 affected by the fixed pattern noise. The output waveform of the black level illustrated with the Pix_out in FIG. 8 shifts from the real black level VDD by the positive or negative fixed pattern noise (ΔFPN) occurring in each pixel signal generating circuit 500 as described in FIG. 9. As described above, each pixel output value of pseudo black level reflects a difference due to FPN (influence of ΔFPN), so that variation in pixels in the corrected read image occurs, resulting in deterioration of image quality.

Figure 10:
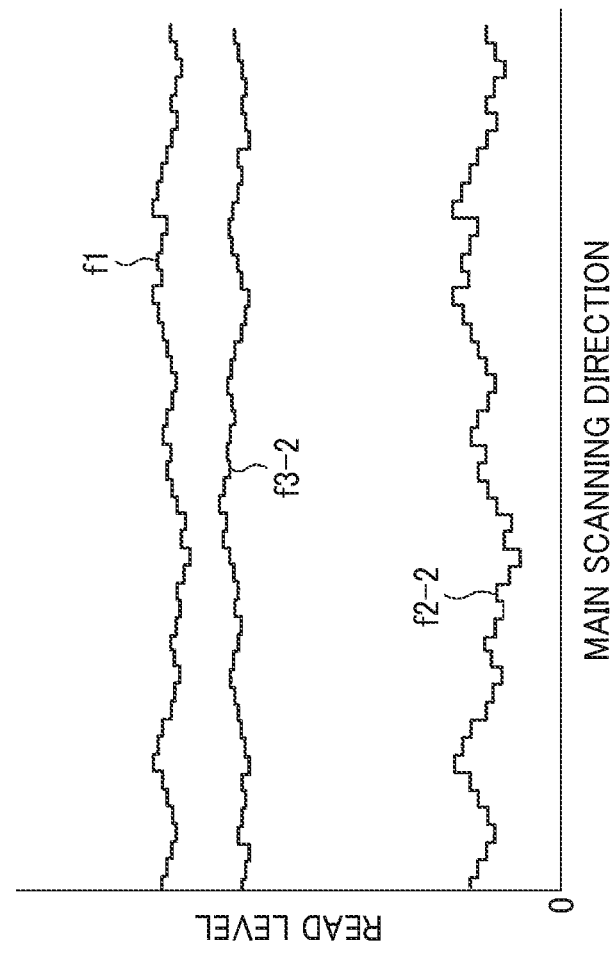
FIG. 10 is a graph illustrating an example of read levels in performing the black shading correction in the pseudo dark generating mode.

FIG. 10 is a graph illustrating read levels in case of the black shading correction in the pseudo dark generating mode. A line f2-2 indicates variation in the pseudo black level in the main scanning direction. A line f3-2 indicates change of the read level in the main scanning direction after the pseudo black level of the line f2-2 is subtracted from the read level of the line f1. As indicated with the line f3-2, when the read image is corrected with the pseudo black level, the variation due to ΔFPN of each PD remains without being corrected, so that the black level of the read level of the read image after the black shading correction cannot be even with high accuracy. That is, image quality in the pseudo dark generating mode is low compared to the image quality in the black shading using the real black level obtained in the normal reading mode.

The longer an accumulation time (line cycle) is, the larger the dark current becomes, resulting in more difficulty to correct the FPN. That is, disadvantage for a scanner with low productivity occurs when the read image is generated. On the other hand, the image scanning device 100 does not require the black shading correction with high accuracy in detecting a document size, because the image scanning device 100 detects a document with binarized read levels. Accordingly, the pseudo black level can be used for the black shading correction in detecting the document size. In short, a way of correcting the read image can be selective, in which the pseudo black level is used to correct the read image in a pre-scanning operation and the real black level is used to correct the read image in a scanning operation.

The operation of the image scanning device 100 is described below. The image scanning device 100 transitions to a power-saving state when there is no operation or no input from the user for a certain time. Additionally, the first carriage 106 moves to a wait position, which is described later, when the pressure plate 223 is opened or the image scanning device 100 transitions to the power-saving state.

Figure 11:
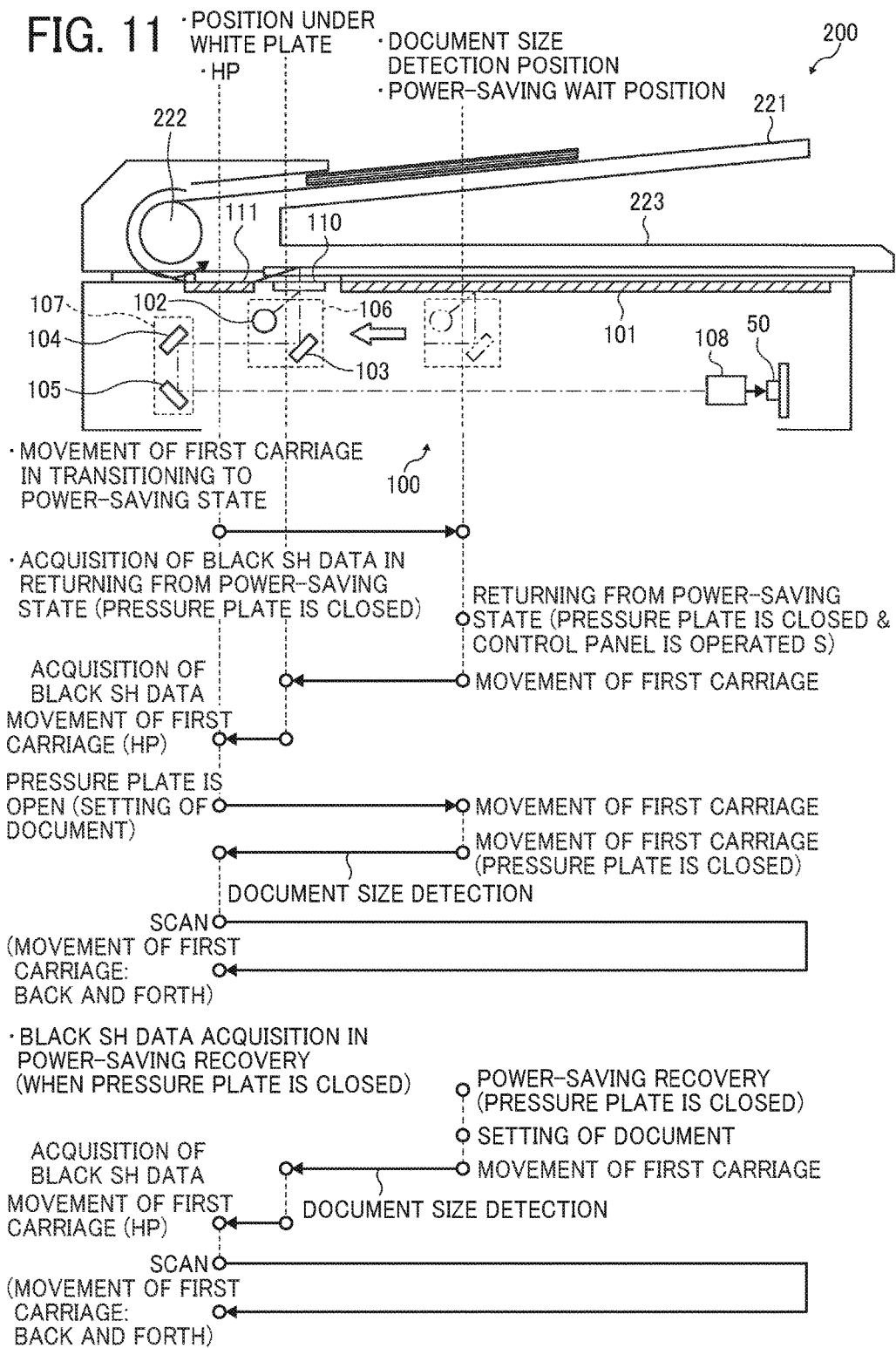
FIG. 11 is a diagram schematically illustrating operation of a first carriage when the image scanning device transitions to a power-saving state and when the image scanning device returns from the power-saving state.

Operation of the first carriage 106 in a case where the image scanning device 100 transitions to the power-saving state, and in a case where the image scanning device 100 returns from the power-saving state are described below. FIG. 11 is a diagram schematically illustrating the operation of the first carriage 106 in the case where the image scanning device 100 transitions to the power-saving state and also in the case where the image scanning device 100 returns from the power-saving state. Circles and arrows illustrated in a lower part of FIG. 11 indicate positions and movement of the first carriage 106, respectively.

The image scanning device 100 causes the first carriage 106 to move to the wait position (power-saving wait position: document size detection position) in transitioning to the power-saving state, for preparing for the detection of the document size performed when returning from the power-saving state. There are, for example, two triggers (situations) which cause the image scanning device 100 to return from the power-saving state (triggers for recovery). One of the triggers for the recovery is operation of recovery button for returning from the power-saving state (recovery button) on the control panel 332 performed by the user, and the other is setting of document (opening of the pressure plate 223) performed by the user.

As described in FIG. 11, when the user operates the recovery button on the control panel 332 and the image scanning device 100 returns from the power-saving state, the first carriage 106 moves to a position under the reference white plate 110 (position under the white plate) to obtain black shading data (black SH data:real black level) and then moves to a home position (HP).

When the user opens the pressure plate 223, the first carriage 106 moves to the document size detection position where the first carriage 106 can detects the document size. After the user sets the document on the contact glass 101, the first carriage 106 detects the document size by moving to a home position (HP) side in response to a trigger that is closing of the pressure plate 223. The first carriage 106 uses, for this size detection, the same black shading data that is initially obtained when moving to the position under the reference white plate 110. Subsequently, the scanning operation is performed after copy start is instructed by the user and a series of operation is completed.

In a lower part of FIG. 11, an example of movement of the first carriage 106 in the case where the image scanning device 100 returns from the power-saving state in response to the trigger that is opening of the pressure plate 223 is illustrated. At a time of returning from the power-saving state, the first carriage 106 is at the position where the size can be detected (document size detection/detectable position), and the first carriage 106 stays at the position to wait and prepare for the setting of the document performed by the user.

After the user sets the document on the contact glass 101, the first carriage 106 detects the document size by moving to the home position (HP) side in response to the trigger that is closing of the pressure plate 223. The black shading data used for the size detection cannot be obtained in the light shielding state so that pseudo black level obtained with electron shutter is used. After the size detection, the first carriage 106 moves to the position under the reference white plate 110 to obtain the black shading data and then moves to the home position (HP). Subsequently, scanning operation is performed after copy start is instructed by the user and a series of operation is completed.

As described above, the image scanning device 100 has the two types of triggers to return from the power-saving state that is a wait state to a normal operation state. The image scanning device 100 is set to return from the power-saving state to the normal operation state in response to one of the triggers, which are user's actions. One of the triggers is that the user press the recovery button, which is for returning from the power-saving state, on the control panel 332. The other one of the triggers is that the user opens the pressure plate 223 of the ADF 200 to place the document on the contact glass 101.

Figure 12:
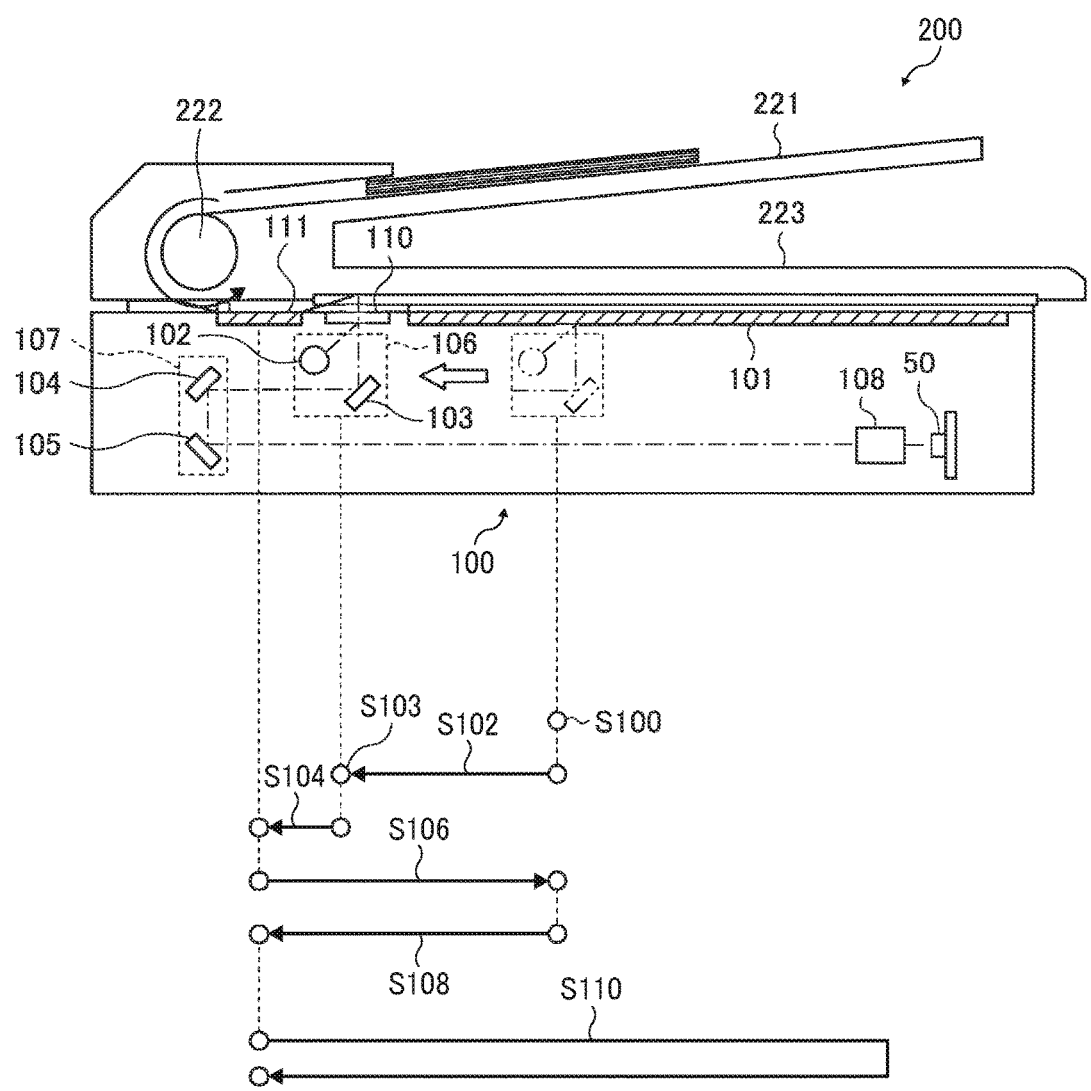
FIG. 12 is a diagram schematically illustrating an example of operation of the image scanning device in returning from the power-saving state when a mode switching button for returning from the power-saving state on a control panel is pressed by a user under conditions where a pressure plate is closed.

FIG. 12 is a diagram illustrating the operation of the image scanning device 100 in returning from the power-saving state in response to the trigger that the user presses the recovery button, which is for returning from the power-saving state, on the control panel 332 under a condition where the pressure plate 223 is closed. Circles and arrows illustrated in a lower part of FIG. 12 indicate positions and movement of the first carriage 106, respectively.

The image scanning device 100 returns from the power-saving state to the normal operation state when the user presses the recovery button under the condition where the pressure plate 223 is closed (S100). When the image scanning device 100 returns from the power-saving state to the normal operation state, the first carriage 106 moves to the position under the reference white plate 110 from the wait position (document size detection position) (S102). The reference white plate 110 includes a member having a function of shielding light from the outside.

The black shading corrector 30 obtains a real black level (reference signal) when the first carriage 106 is under the reference white plate 110 (S103). The first carriage 106 moves to the home position (HP) from the position under the reference white plate 110 (S104). The home position (HP) is located under the sheet-through reading slit 111. When the user opens the pressure plate 223 and sets the document on the contact glass 101, the first carriage 106 moves to the document size detection position (S106).

When the user closes the pressure plate 223, the first carriage 106 moves to the home position (HP) again (S108). The image scanning device 100 detects the document size during this movement of the first carriage 106. The black shading data used for this document size detection is data that is previously obtained when the first carriage 106 initially moves to the position under the reference white plate 110. Then, the image scanning device 100 scans the document by causing the first carriage 106 to moves back and forth in a document scanning range, in response to an instruction of scanning the image from the user via the control panel 332 (S110).

Figure 13:
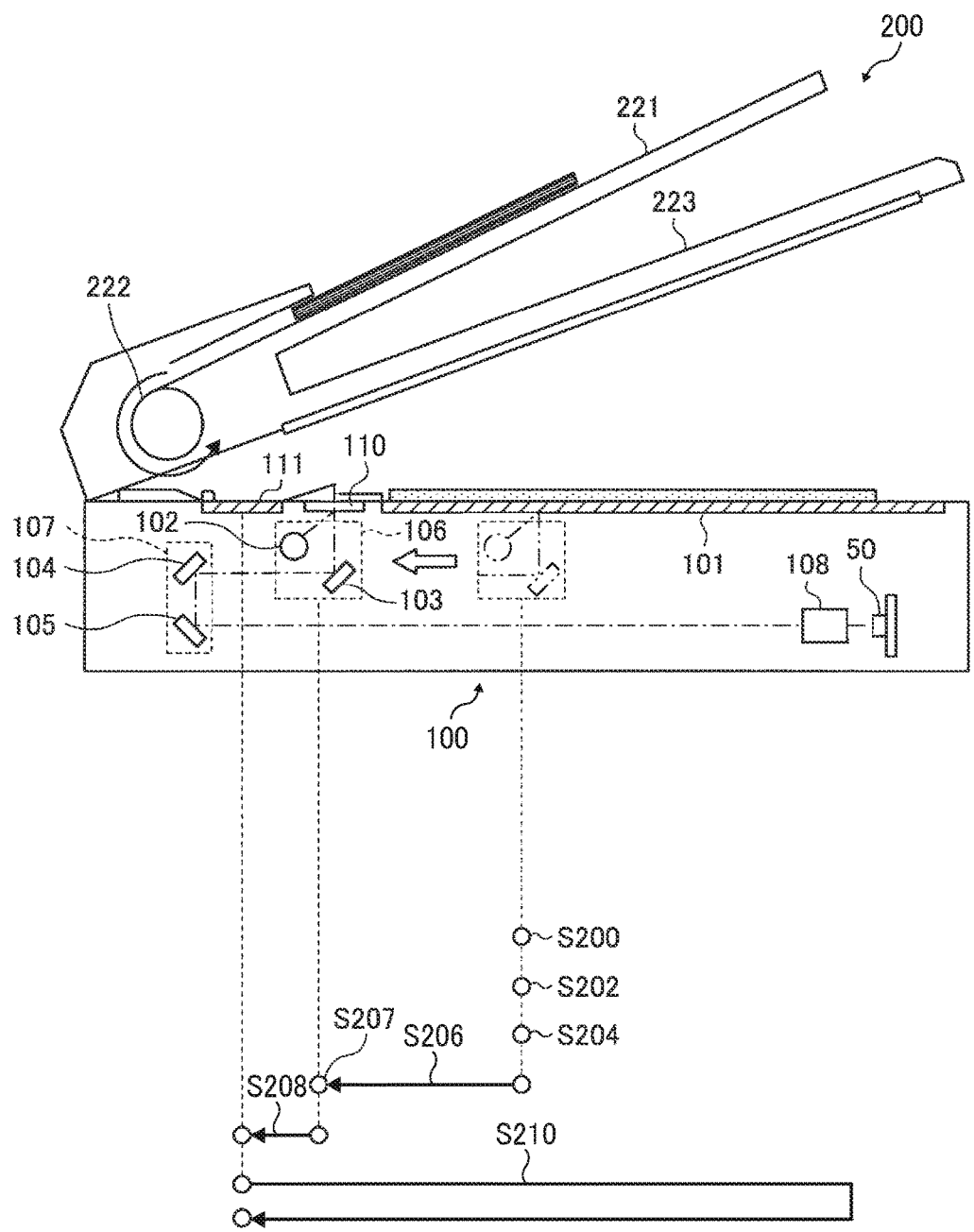
FIG. 13 is an example diagram schematically illustrating operation of the image scanning device in returning from the power-saving state in response to an action of the user opening the pressure plate of the ADF.

FIG. 13 is a diagram illustrating operation of the image scanning device 100 in returning from the power-saving state in response to the action of the user opening the pressure plate 223 of the ADF 200. The image scanning device 100 returns from the power-saving state to the normal operation state when the pressure plate 223 is opened (S200). The first carriage 106 is at the document size detectable position at the time of returning from the power-saving mode, and stays at the position without moving (or moves to the wait position) to wait and prepare for the document being placed on the contact glass 101 by the user.

When the pressure plate 223 is closed after the user placed the document on the contact glass 101 (S202), the black shading corrector 30 obtains the pseudo black level (pseudo reference signal) (S204), and the first carriage 106 moves to the position under the reference white plate 110 from the wait position (document size detection position) (S206). The image scanning device 100 detects the document size during this movement of the first carriage 106. The black shading data used for this document size detection is the pseudo black level.

The black shading corrector 30 obtains the real black level (reference signal) when the first carriage 106 is under the reference white plate 110 (S207). The first carriage 106 moves to the home position (HP) from the position under the reference white plate 110 (S208). The image scanning device 100 causes the first carriage 106 to move back and forth in the document scanning range to scan the document when the control panel 332 is operated by the user and receives an instruction of image scanning. The black shading corrector 30 obtains the real black level when the first carriage 106 initially passes under the reference white plate 110, but the embodiment is not limited to this, but the black shading corrector 30 can obtains the real black level whenever the light is shielded.

Figure 14:
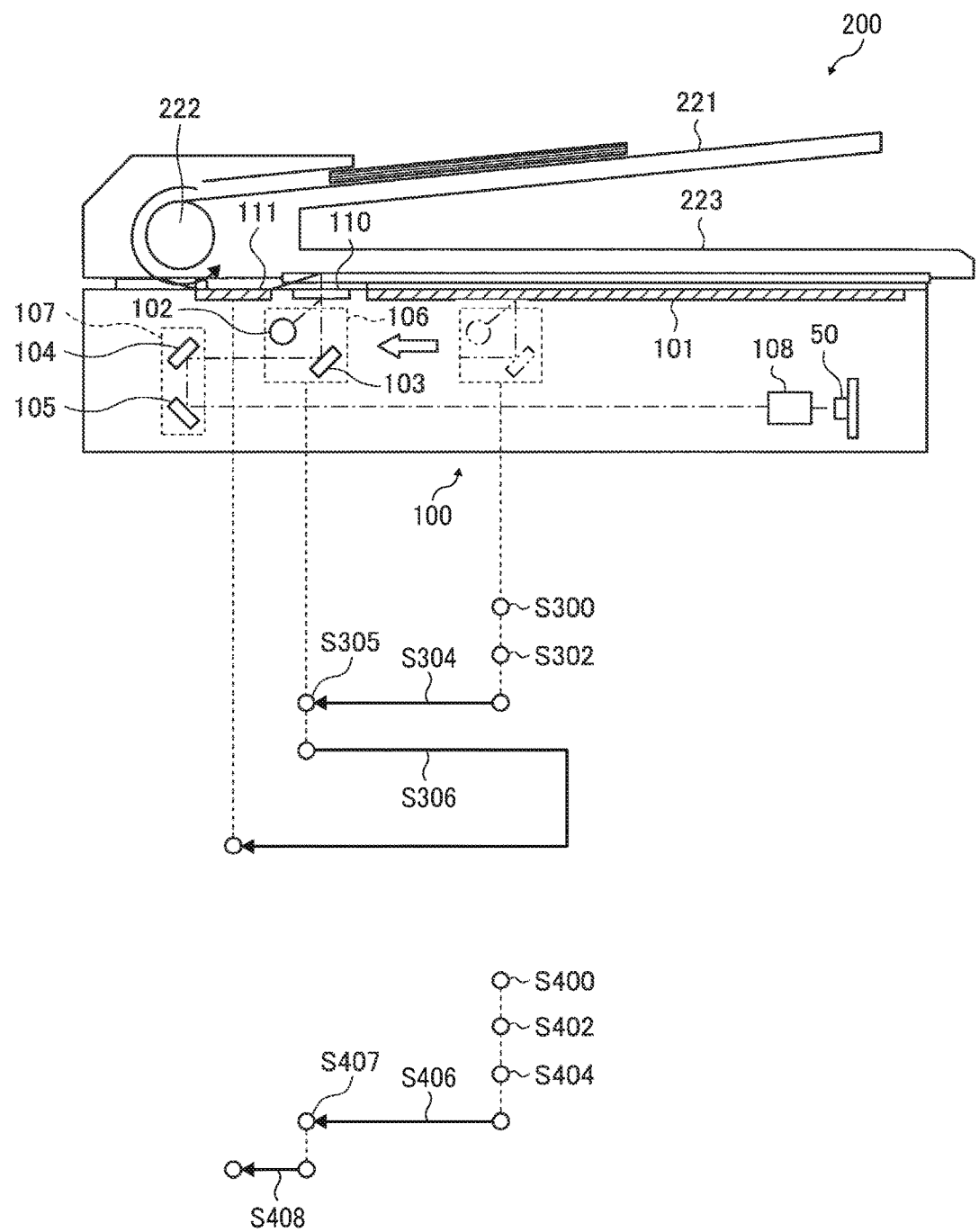
FIG. 14 is a diagram illustrating a comparison between comparative example operation of the image scanning device and embodiment operation of the image scanning device.

FIG. 14 is a diagram illustrating a comparison between comparative example operation of the image scanning device 100 (S300-S306) and embodiment operation of the image scanning device 100 (S400-S408). In the comparative example operation, the image scanning device 100 returns from the power-saving state to the normal operation state when the pressure plate 223 is opened (S300). When the pressure plate 223 is closed after the document is placed on the contact glass 101 by the user (S302), the first carriage 106 moves to the position under the reference white plate 110 from the wait position (S304).

The black shading corrector 30 obtains the real black level (reference signal) when the first carriage 106 is under the reference white plate 110 (S305). The image scanning device 100 detects the document size during the first carriage 106 returns from the position under the reference white plate 110 to the document size detection position, and then causes the first carriage 106 to return to the home position (HP) (S306).

In the embodiment operation, the image scanning device 100 returns from the power-saving state to the normal operation state when the pressure plate 223 is opened (S400). At the time of returning from the power-saving state, the first carriage 106 is at the document size detectable position, and stays at the position without moving to wait and prepare for the document being placed on the contact glass 101 by the user.

When the pressure plate 223 is closed after the user placed the document on the contact glass 101 (S402), the black shading corrector 30 obtains the pseudo black level (pseudo reference signal) (S404), and the first carriage 106 moves to the position under the reference white plate 110 from the wait position (document size detection position) (S406). The image scanning device 100 detects the document size during this movement of the first carriage 106. The black shading data used for this document size detection is the pseudo black level.

The black shading corrector 30 obtains the real black level (reference signal) when the first carriage 106 is under the reference white plate 110 (S407). The first carriage 106 moves to the home position (HP) from the under side of the reference white plate 110 (S408). As described above, the image scanning device 100 according to the embodiment can obtain the pseudo black level without moving the first carriage 106 from the wait position, so that a time for moving the first carriage 106 is unnecessary.

The operation performed by the image forming apparatus 300 (or the image scanning device 100) is described below. First operation is performed by the image forming apparatus 300 (or the image scanning device 100) using a predetermined reference signal. The reference signal is obtained during operation in the normal reading mode in the first operation. Second operation is performed by the image forming apparatus 300 (or the image scanning device 100) using the pseudo reference signal that is a predetermined pseudo signal. The pseudo reference signal is obtained during operation in the pseudo dark generating mode in the second operation.

Figure 15:
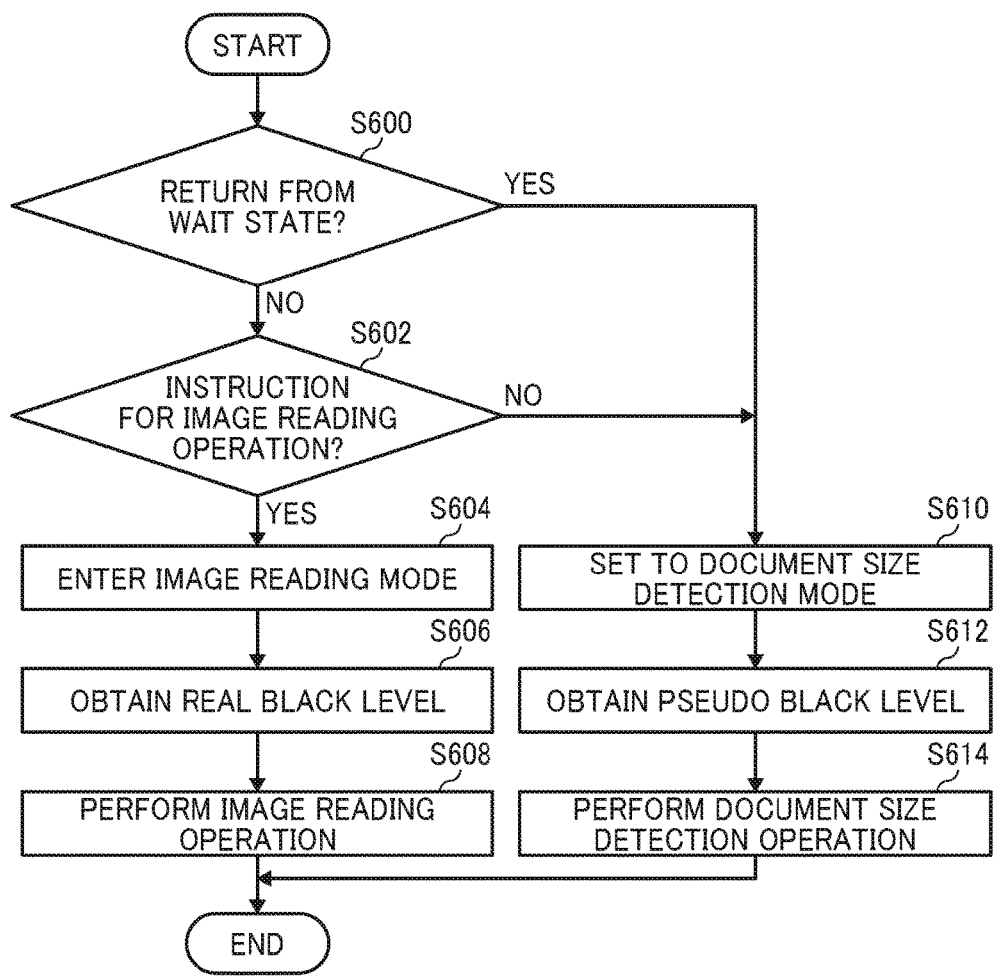
FIG. 15 is a flowchart illustrating operation performed by a controller of the image forming apparatus (image scanning device)

FIG. 15 is a flowchart illustrating an operation performed by a controller of the image forming apparatus 300 (image scanning device 100). As described in FIG. 15, the controller determines, for example, whether the image scanning device 100 returns from the wait state (S600). This processing is necessary to determine whether to obtain the pseudo black level in advance. If the controller determines that the image scanning device 100 does not return from the wait state (S600: NO), the process continues to S5602. If the controller determines that the image scanning device 100 returns from the wait state (S600: YES), the process continues to S610.

In S602, the controller determines if there is an instruction for an image scanning operation from the user. If the controller determines that there is the instruction for the image reading operation (S602: YES), the process continues to S604. If the controller determines that there is no instruction for the image reading operation (S602: NO), the process continues to S610.

The controller sets the image scanning device 100 to an image reading mode (S604), obtains a real black level (reference signal) by performing the first operation (S606), and then performs the image scanning operation to scan an image object (S608). With the image scanning operation, the read image is obtained in a manner that the image data of the document output from the photoelectric conversion element 50 due to the document reading is corrected using the real black level in the black shading corrector 30. Accordingly, a multilevel process can be performed in the post-stage.

The controller sets the image scanning device 100 to a document size detection mode (S610), obtains a real black level (pseudo reference signal) by performing the second operation (S612) when determining there is no instruction for the image reading operation, and then performs the document size detection operation (S614). With the document size detection operation, the read image is obtained in a manner that the image data of the document output from the photoelectric conversion element 50 due to the document reading is corrected using the pseudo black level, and the document size is obtained after the corrected image is binarized.

That is, the controller causes the pixel signal generating circuit 500 to operate the first operation when the accuracy level of the signal is required to be equal to or more than a predetermined accuracy level, for example, when the multilevel process is required in a post-stage in the image reading operation. Additionally, the controller causes the pixel signal generating circuit 500 to operate the second operation when the accuracy level of the signal is allowed to be below the predetermine accuracy level, for example, when the multilevel process is not required in the post-stage, but the binarization process is enough, for example, in such as a document size detection operation. The predetermined accuracy level is previously determined by, for example, a user according to empirical data.

Figure 16:
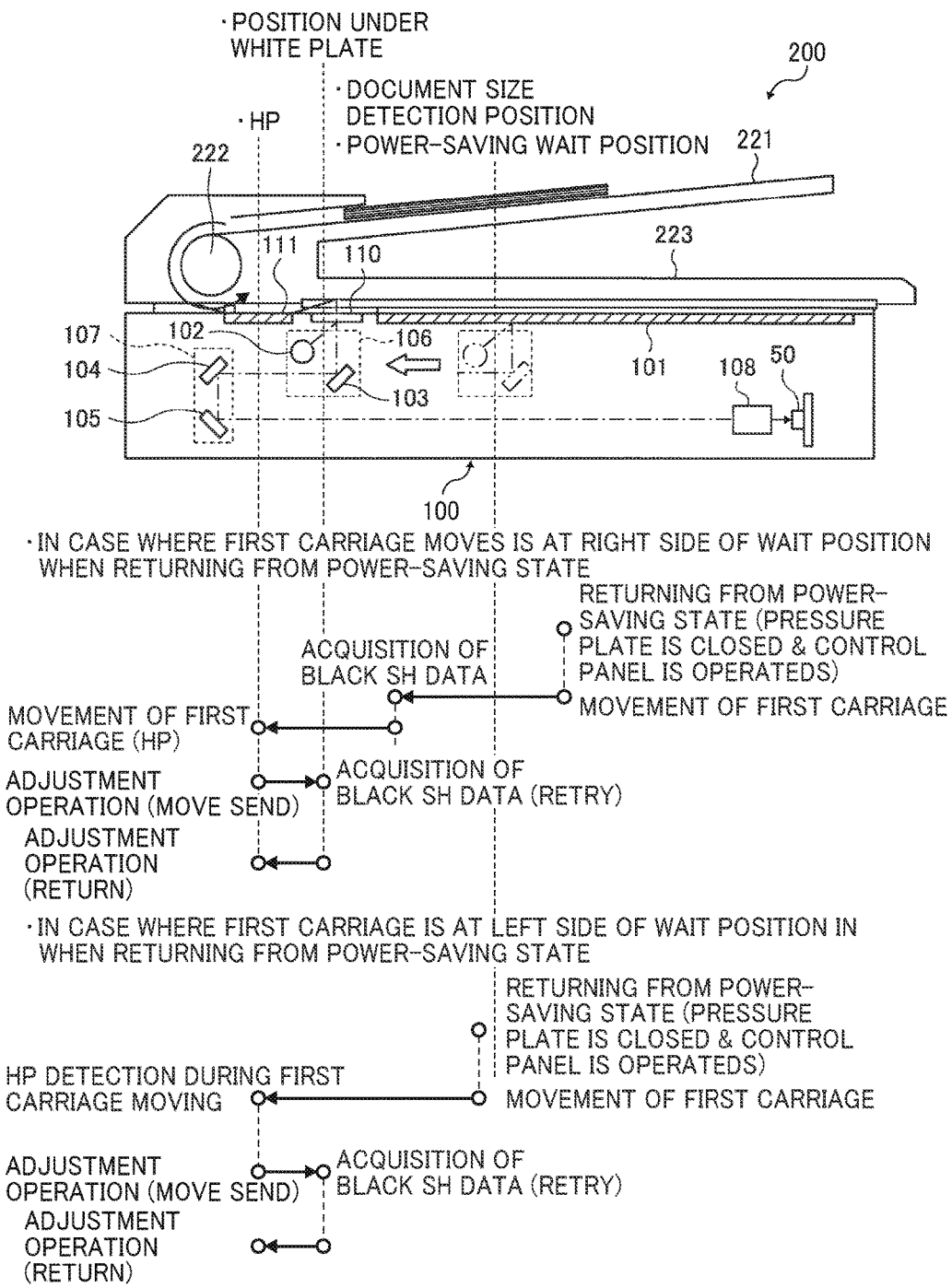
FIG. 16 is a diagram illustrating an operation of obtaining black shading data in a case where the first carriage is not at a wait position where the first carriage is supposed to be.

The image scanning device 100 is set not to supply a power to a motor in the power-saving state in which excitation is run out, so that the first carriage 106 may move due to vibration. FIG. 16 is a diagram illustrating an operation of acquiring the black shading data in a case where the first carriage 106 is not at exactly a proper position of the wait position, namely a position of the first carriage 106 is shifted from the wait position.

When the image scanning device 100 returns from the power-saving state and the first carriage 106 is not at a predetermined position (in particular, when the first carriage 106 is not at the position under the document being set), the image scanning device 100 causes the first carriage 106 to move to an upstream side (left side in FIG. 16) by a certain distance. However, the first carriage 106 reaches the home position (HP) and cannot detect the document size. The image scanning device 100, then, once returns the first carriage 106 to the home position (HP) as the retry operation for adjusting the position of the first carriage 106. At this time, the first carriage 106 moves back and forth under the reference white plate 110, so that the black shading corrector 30 can obtain the real black level.

On the other hand, when the first carriage 106 is at an upper side of the position of the document being set and the first carriage 106 attempts to obtain the real black level with assumption that the reference white plate 110 is at a left side by a certain distance from the wait position, the first carriage 106 cannot obtain the black level because of the light shielding state. The image scanning device 100, then, once returns the first carriage 106 to the home position (HP) as the retry operation for adjusting the position of the first carriage 106. At this time, the first carriage 106 moves back and forth under the reference white plate 110, so that the black shading corrector 30 can obtain the real black level.

When the image scanning device 100 reads document sheets continuously using the ADF 200, there are spaces (intervals) between sheets. The image scanning device 100 causes the light source device 102 to turn off when a space between sheets comes to an image reading position to obtain the black level, so that the black level can be obtained during the continuous reading of the documents.

Additionally, in a case where one of the document sheets is stopped at an improper position because the sheet is accidentally jammed to the ADF 200, clearance may occurs due to the jammed document sheet. In this case, the image scanning device 100 performs the recovery operation to obtain the real black level again.

Second Embodiment

The principles applied to the signal processing device according to the first embodiment can be applied to not only the image forming apparatus and the image scanning device, but also other devices. For example, the devices such as a radiation examination device, an electromagnetic measuring machine, and an optical wave measuring device respectively uses a quantity of radiation, a quantity of electromagnetic, and a quantity of optical wave as a physical quantity, which corresponds the quantity of light in the first embodiment.

Figure 17:
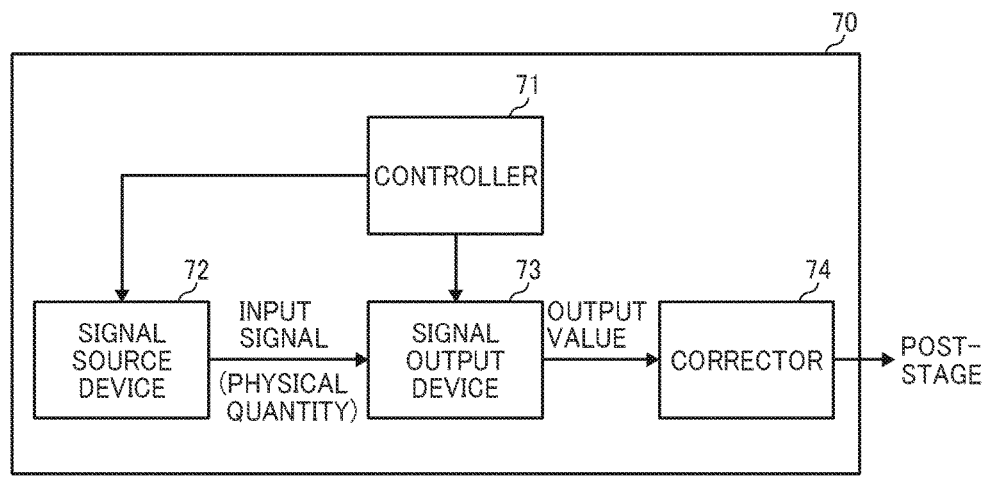
FIG. 17 is a block diagram illustrating a principal configuration of a signal processing device.

FIG. 17 is a block diagram illustrating a principal configuration of a signal processing device 70. The signal processing device includes a controller 71, a signal source device 72, a signal output device 73, and a corrector 74.

The controller 71 generates a control signal and controls the signal source device 72 and the signal output device 73 based on the control signal.

The signal source device 72 outputs a physical quantity. For example, when the physical quantity is a quantity of light, the signal source device corresponds to a light source device, and when the physical quantity is a quantity of radiation, the signal source device corresponds to a radioactive substance.

The signal output device 73 converts the physical quantity into an electronic signal to be output to the corrector 74. The signal output device 73 has a plurality of modes as correction modes. For example, there are two modes, a first mode and a second mode. In the first mode, the physical quantity being input is converted and a signal (real signal) having characteristics of the signal output device 73 is output according to control of the controller 71, when a processing condition value (e.g. conversion accuracy or processing speed of the above-mentioned physical quantity) required in a processor in the post-stage is equal to or above a threshold. In the second mode, the physical quantity being input is converted and a signal (pseudo signal) having a part of or no characteristics of the signal output device 73 is output according to the control of the controller 71, when the processing condition value required in the processor in the post-stage is below the threshold. The threshold is previously set, for example, by the user according to empirical data.

The corrector 74 corrects the signal output from the signal output device 73 using one of the real signal in the first mode and the pseudo signal in the second mode, and outputs the corrected signal to the post-stage.

Each component is configured by a central processing unit (CPU) that operates according to software or a circuit such as an ASIC.

Figure 18:
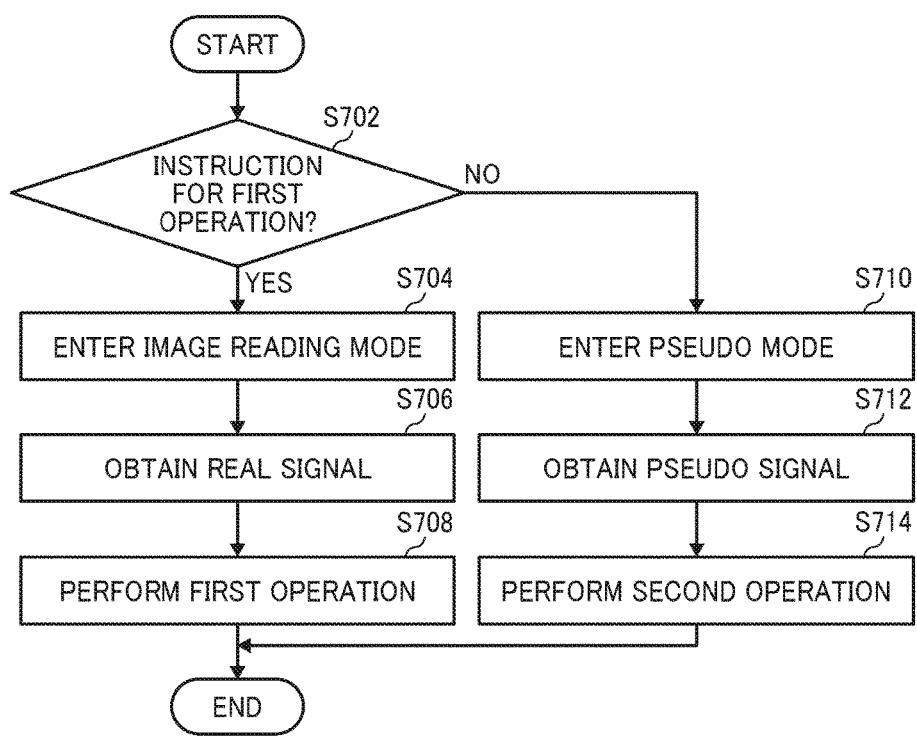
FIG. 18 is a flowchart illustrating operation performed by a controller of the signal processing device.

FIG. 18 is a flowchart illustrating the operation of the controller 71 of the signal processing device 70. The first operation in the embodiment is an operation performed by the signal processing device 70 using the real signal. The real signal is obtained during the first operation. The second operation in the embodiment is an operation performed by the signal processing device 70 using the pseudo signal. The pseudo signal is obtained during the second operation.

As illustrated in FIG. 18, the controller 71 determines if there is an instruction for the first operation from a user (S702). If the controller 71 determines that there is the instruction for the first operation (S702: Yes), the process continues to S704. If the controller determines that there is no instruction for the first operation (S702: No), the process continues to S710.

The controller 71 causes the signal processing device 70 to enter a normal mode (S704), obtains the real signal by performing the first operation (S706), and continuously performs the first operation using the real signal (S708). On the other hand, the controller 71 causes the signal processing device 70 to enter a pseudo mode (S710), obtains the pseudo signal by performing the second operation (S712), and continuously performs the second operation (S714).

According to the first and the second embodiment, the signal is efficiently corrected and maintains necessary accuracy of the output signal.

Although the exemplary embodiments of the disclosure have been described and illustrated above, such description is not intended that the disclosure be limited to the illustrated embodiments. Numerous additional modifications and variations are possible in light of the above teachings. It is therefore to be understood that within the scope of the appended claims, the embodiments may be practiced otherwise than as specifically described herein. For example, elements and/or features of different illustrative embodiments may be combined with each other and/or substituted for each other within the scope of this disclosure and appended claims.

What is claimed is:

1. A signal processing device in a scanning device that further includes an optical reading device including a light source device to emit light to be reflected from an object, the signal processing device comprising:

a signal output circuit to receive the light reflected from the object and to generate and output a signal according to a quantity of the received light, the signal output circuit including a plurality of pixels, each pixel of which outputs a corresponding pixel output signal;

a controller to control the signal output circuit; and a corrector to correct, for each pixel amongst the plurality of pixels, a pixel output signal to be corrected for the pixel, wherein the signal output circuit selectively performs, for each particular pixel amongst the plurality of pixels and according to control of the controller based on a processing signal value of the pixel output signal to be corrected for the particular pixel, one of (a) a first operation of generating and outputting a characteristic signal that indicates characteristics of the particular pixel when the light is received by the particular pixel, and (b) a second operation of generating and outputting a pseudo signal that is spuriously generated by the particular pixel when the particular pixel is shielded from the light, and the corrector corrects the pixel output signal to be corrected for the particular pixel using the characteristic signal obtained by performing the first operation when the processing condition value of the pixel output signal to be corrected for the particular pixel is equal to or above a threshold, and the pseudo signal obtained by performing the second operation when the processing condition value of the pixel output signal to be corrected for the particular pixel is below the threshold.

2. An image scanning device, comprising the signal processing device of claim 1, wherein the signal processing device further includes a movement controller to control the optical reading device to move in relation to the object based on the processing condition value, and the signal output circuit includes a plurality of pixels, each of which outputs a signal based on a quantity of incident light received, the quantity of incident light received by each of the plurality of pixels being based on movement of the optical reading device.

3. The image scanning device of claim 2, wherein the controller causes each of the plurality of pixels to output the characteristic signal, which corresponds to that is a reference signal, when the plurality of pixels are shielded from light in response to returning from a wait state of the image scanning device.

4. The image scanning device of claim 3, wherein the controller determines that the plurality of pixels are shielded when the optical reading device moves to a position under a material for shielding the light at a first time after returning from the wait state.

5. The image scanning device of claim 2, wherein the controller causes the plurality of pixels to perform the first operation when the optical reading device is not at a wait position and is controlled by the controller to start operating.

6. The image scanning device of claim 2, further comprising a conveying device, wherein the controller causes the plurality of pixels to perform the first operation when the conveying device causes the image scanning object to be stopped at an improper position that is different from a predetermined position.

7. An image forming apparatus, comprising:
the image scanning device of claim 2; and
an image forming device to form an image based on image data read with the image scanning device.

8. The image scanning device of claim 1, wherein
when the processing signal value of the pixel output signal to be corrected is equal to or above the predetermined threshold, the controller controls the optical reading device to perform a scanning operation, and causes the signal output circuit to generate a first input signal and to perform the first operation to generate the characteristic signal, and the corrector corrects the first input signal based on the characteristic signal, and
when the processing signal value of the pixel output signal to be corrected is below the predetermined threshold, the controller controls the optical reading device to perform a pre-scanning operation, and causes the signal output circuit to generate a second signal and to perform the second operation to generate the pseudo signal, and the corrector corrects the second input signal based on the pseudo signal.

9. A method performed by a signal processing device, in a scanning device that further includes an optical reading device including a light source device to emit light to be reflected from an object, to correct a signal to be corrected in a signal output circuit to receive the light reflected from the object and to output a signal according to a quantity of the received light, the signal output circuit including a plurality of pixels each outputting a corresponding pixel output signal, the method comprising:

(a) controlling, by a controller, the signal output circuit to selectively perform, for each particular pixel amongst the plurality of pixels and based on a processing signal value of the pixel output signal to be corrected for the particular pixel, one of (1) a first operation of generating a characteristic signal that indicates characteristics of the particular pixel when the light is received by the particular pixel and (2) a second operation of generating a pseudo signal that is spuriously generated when the particular pixel is shielded from the light; and (b) correcting, for each particular pixel amongst the plurality of pixels, the pixel output signal to be corrected, which is output from the particular pixel, the correcting using the characteristic signal obtained by performing the first operation when the processing condition value of the pixel output signal to be corrected is equal to or above a threshold, and the pseudo signal obtained by performing the second operation when the processing condition value of the pixel output signal to be corrected is below the threshold.

10. The method of claim 9, further comprising:
generating and outputting, in the first operation for the particular pixel, a signal according to a quantity of light received after the signal output circuit outputs a reference signal corresponding to the characteristic signal and movement of the optical reading device when an accuracy level, which corresponds to the processing condition value, of the pixel output signal to be corrected is equal to or above a predetermined accuracy; and
generating and outputting, in the second operation for the particular pixel, a signal according to the quantity of light received after the signal output circuit outputs a pseudo reference signal corresponding to the pseudo signal, when the accuracy level of the pixel output signal to be corrected is permitted to be below the predetermined accuracy.

11. The method of claim 9, further comprising:
(c) controlling the optical reading device to perform a pre-scanning operation and a scanning operation;
(d) when the controller controls the optical reading device to perform the scanning operation in (c), determining that the processing signal value of the pixel output signal to be corrected is equal to or above a predetermined threshold, and causing the signal output circuit to generate a first signal and to perform the first operation to generate the characteristic signal, and causing the pixel output signal to be corrected based on the characteristic signal;
(e) when the controller controls the optical reading device to perform the pre-scanning operation in (c), determining that the processing signal value of the pixel output signal to be corrected is below the predetermined threshold, and causing the signal output circuit to generate a second signal and to perform the second operation to generate the pseudo signal, and correcting the second signal based on the pseudo signal.

12. The method of claim 11, wherein the first signal is generated in (d) according to a quantity of light received after the signal output circuit outputs a reference signal corresponding to the characteristic signal and movement of the optical reading device when an accuracy level, which corresponds to the processing condition value, of the pixel output signal to be corrected is equal to or above a predetermined accuracy; and the second signal is generated in (e) according to the quantity of light received after the signal output circuit outputs a pseudo reference signal corresponding to the pseudo signal, when the accuracy level of the pixel output signal to be corrected is permitted to be below the predetermined accuracy.

\* \* \* \* \*